United States Patent
Matsuhira

(10) Patent No.: US 7,646,510 B2
(45) Date of Patent: Jan. 12, 2010

(54) IMAGE SCANNER PRINTER

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 11/925,198

(22) Filed: Oct. 26, 2007

(65) Prior Publication Data

US 2008/0100857 A1    May 1, 2008

(30) Foreign Application Priority Data

Oct. 27, 2006    (JP) .............................. 2006-293229

(51) Int. Cl.
- *G06K 1/00* (2006.01)
- *G06K 15/00* (2006.01)
- *G06K 9/40* (2006.01)
- *H04N 1/04* (2006.01)
- *H04N 1/407* (2006.01)

(52) U.S. Cl. ........................ 358/1.9; 358/3.26; 358/518; 358/1.18; 382/162; 382/167; 382/254; 382/255; 382/275

(58) Field of Classification Search .................. 358/1.9, 358/3.26, 518, 1.18; 382/162, 167, 254, 382/255, 275

See application file for complete search history.

(56) References Cited

U.S. PATENT DOCUMENTS

| | | | |
|---|---|---|---|
| 6,895,112 B2 * | 5/2005 | Chen et al. | 382/167 |
| 7,130,462 B2 * | 10/2006 | Nakami | 382/166 |
| 7,289,664 B2 * | 10/2007 | Enomoto | 382/167 |
| 2004/0126086 A1 | 7/2004 | Nakamura et al. | |
| 2005/0025474 A1 | 2/2005 | Ono | |
| 2005/0062856 A1 | 3/2005 | Matsushita | |
| 2006/0274963 A1 * | 12/2006 | Hibi | 382/275 |

FOREIGN PATENT DOCUMENTS

| | | |
|---|---|---|
| JP | 2000-092319 A | 3/2000 |
| JP | 2004-145869 A | 5/2004 |
| JP | 2005-055939 A | 3/2005 |
| JP | 2005-094571 A | 4/2005 |
| WO | 2005/015896 A1 | 2/2005 |

* cited by examiner

*Primary Examiner*—Edward L Coles
*Assistant Examiner*—Charlotte M Baker
(74) *Attorney, Agent, or Firm*—Sughrue Mion, PLLC

(57) ABSTRACT

An image scanner printer that reads an original image and that prints out the original image includes a red-eye detection unit, a YCC image storage processing unit, a YCC/RGB conversion unit, a red-eye correction unit, and a print data creating unit. The red-eye detection unit detects red-eye that is included in an image corresponding to a predetermined number of lines of RGB image data when the original image is read. The YCC image storage processing unit converts the predetermined number of lines of the RGB image data into YCC image data and stores all the data as one unit JPEG image. The YCC/RGB conversion unit converts the YCC image data into RGB image data in units of a line or in units of a predetermined number of lines. The red-eye correction unit executes red-eye correction on the RGB image data when an image corresponding to the converted RGB image data includes a red-eye area that is stored in a red-eye table. When print data are created from the RGB image data, the print data creating unit, for RGB image data, among the RGB image data, on which the red-eye correction has been performed, creates print data from the RGB image data on which the red-eye correction has been performed.

2 Claims, 30 Drawing Sheets

FIG. 2A
ORIGINAL IMAGE G0 (RED-EYE)
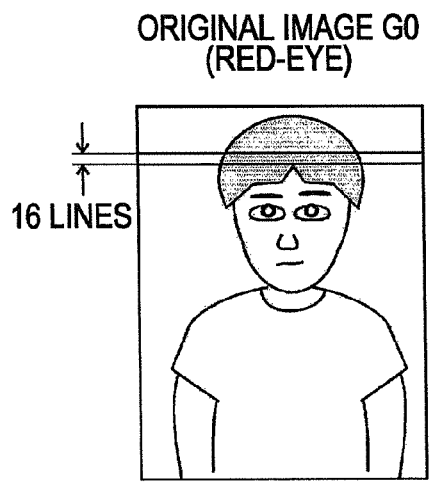
16 LINES
FIG. 2B
IMAGE EXPANSION WITH 16 LINES
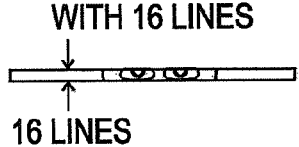
16 LINES
FIG. 2C
IMAGE EXPANSION WITH 32 LINES
32 LINES
FIG. 2D
PRINTED IMAGE PG FOR WHICH RED-EYE CORRECTION HAS BEEN PERFORMED
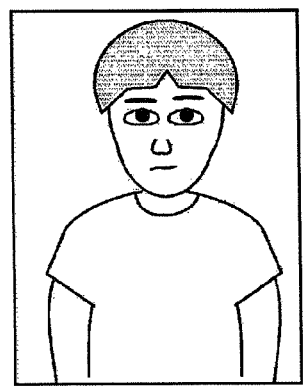
FIG. 3A
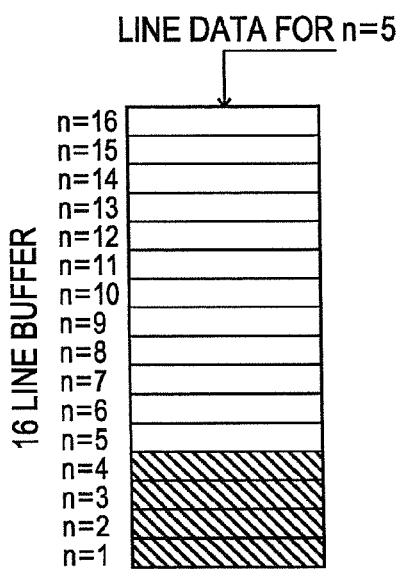
LINE DATA FOR n=5
FIG. 3B
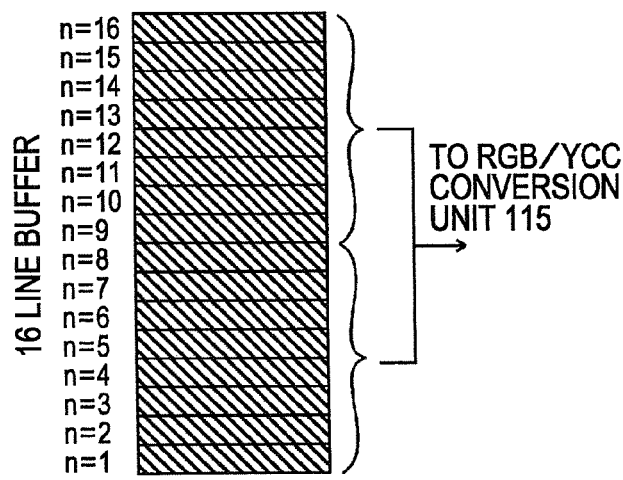
TO RGB/YCC CONVERSION UNIT 115

FIG. 5

RED-EYE AREA TABLE TBL$_{RE}$

| NUMBER OF RED-EYE | CENTER OF RED-EYE | DIAMETER OF RED-EYE |
|---|---|---|
| NB1 | (548, 649) | 8 |
| NB2 | (654, 650) | 8 |
| NB3 | (1026, 957) | 5 |
|  |  |  |
|  |  |  |
|  |  |  |

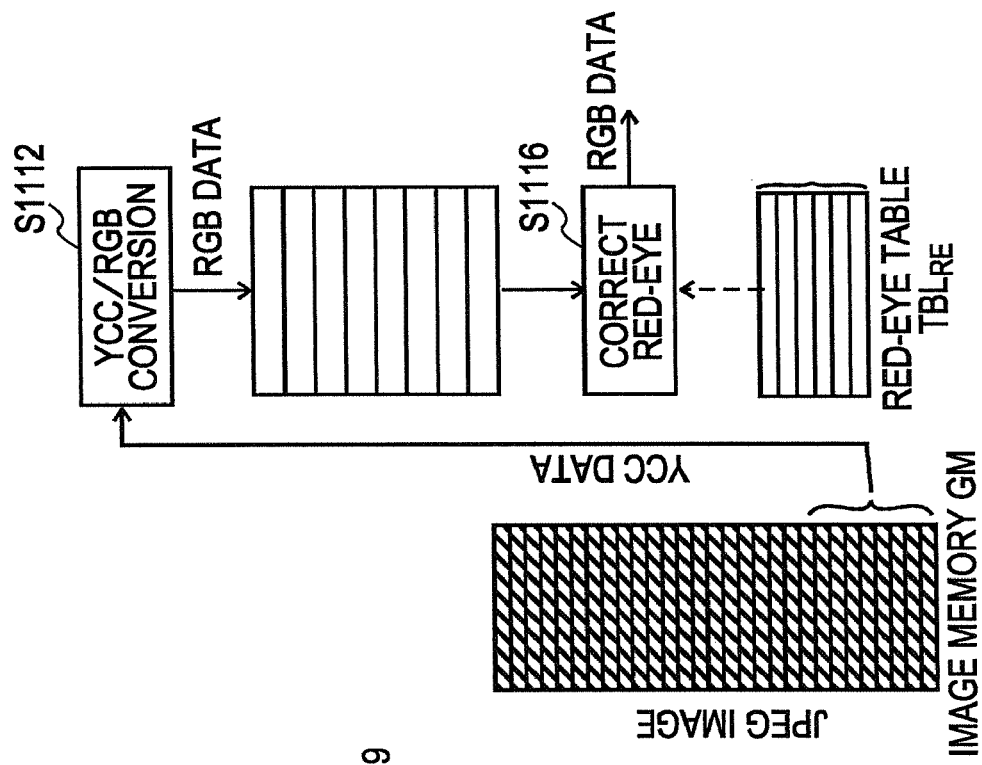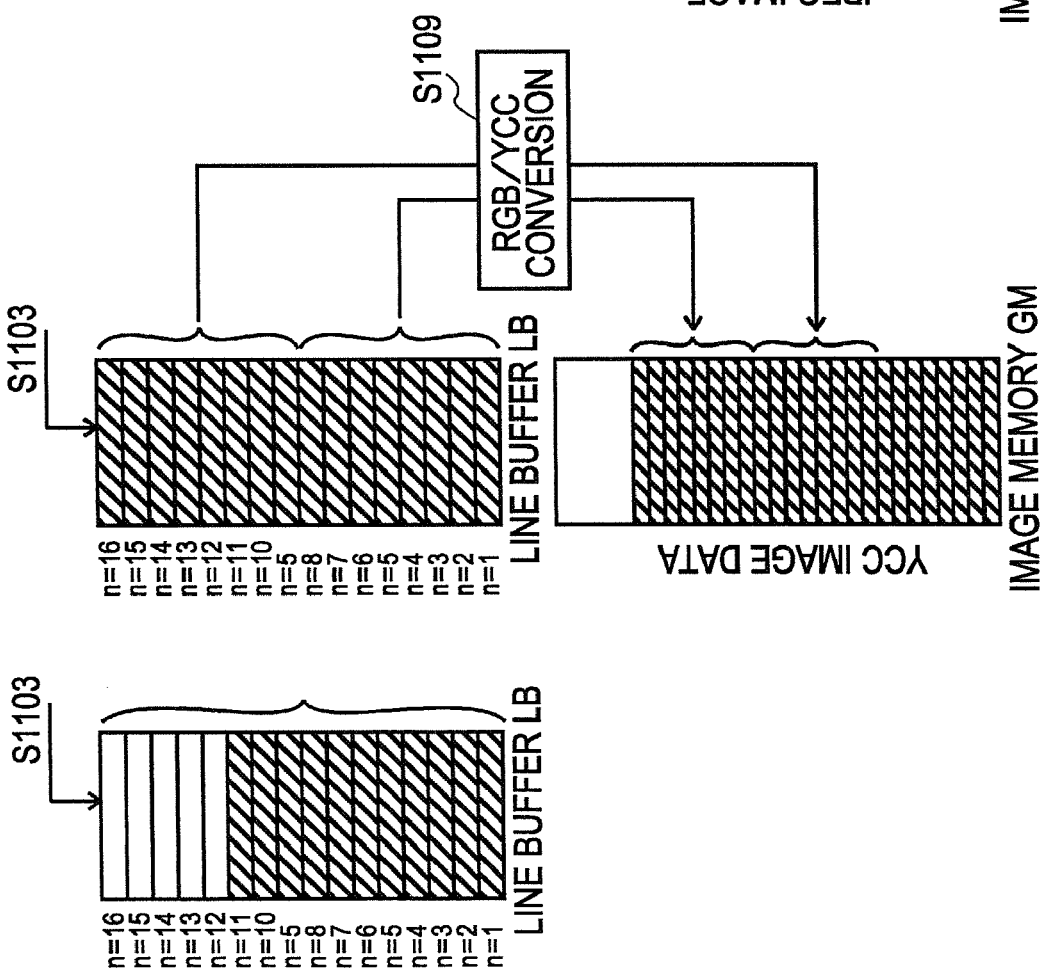

FIG. 10A
ORIGINAL IMAGE G0 (RED-EYE)
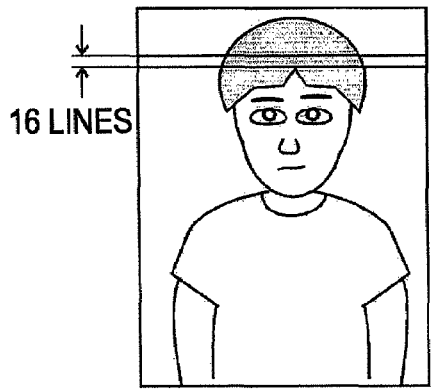
16 LINES
FIG. 10B
IMAGE EXPANSION WITH 16 LINES
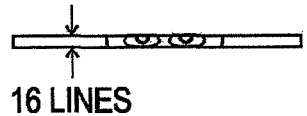
16 LINES
FIG. 10C
IMAGE EXPANSION WITH 32 LINES
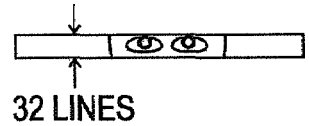
32 LINES
FIG. 10D
PRINTED IMAGE PG FOR WHICH RED-EYE CORRECTION HAS BEEN PERFORMED
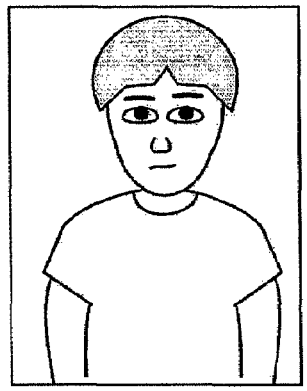
FIG. 11
RED-EYE AREA TABLE TBL$_{RE}$
| NUMBER OF RED-EYE | CENTER OF RED-EYE | DIAMETER OF RED-EYE |
|---|---|---|
| NB1 | (548, 649) | 8 |
| NB2 | (654, 650) | 8 |
| NB3 | (1026, 957) | 5 |
| | | |
| | | |
| | | |

ORIGINAL IMAGE G0

16 LINES

IMAGE EXPANSION
WITH 16 LINES

16 LINES

IMAGE EXPANSION
WITH 32 LINES

32 LINES

PRINTED IMAGE PG
FOR WHICH RED-EYE
CORRECTION HAS
BEEN PERFORMED

FIG. 21

RED-EYE AREA TABLE TBL$_{RE}$

| NUMBER OF RED-EYE | CENTER OF RED-EYE | DIAMETER OF RED-EYE |
|---|---|---|
| NB1 | (548, 649) | 8 |
| NB2 | (654, 650) | 8 |
| NB3 | (1026, 957) | 5 |
|  |  |  |
|  |  |  |
|  |  |  |

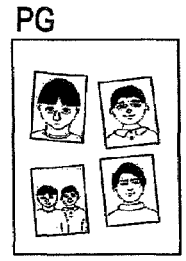
FIG. 26A
PRESCAN
FIG. 26B
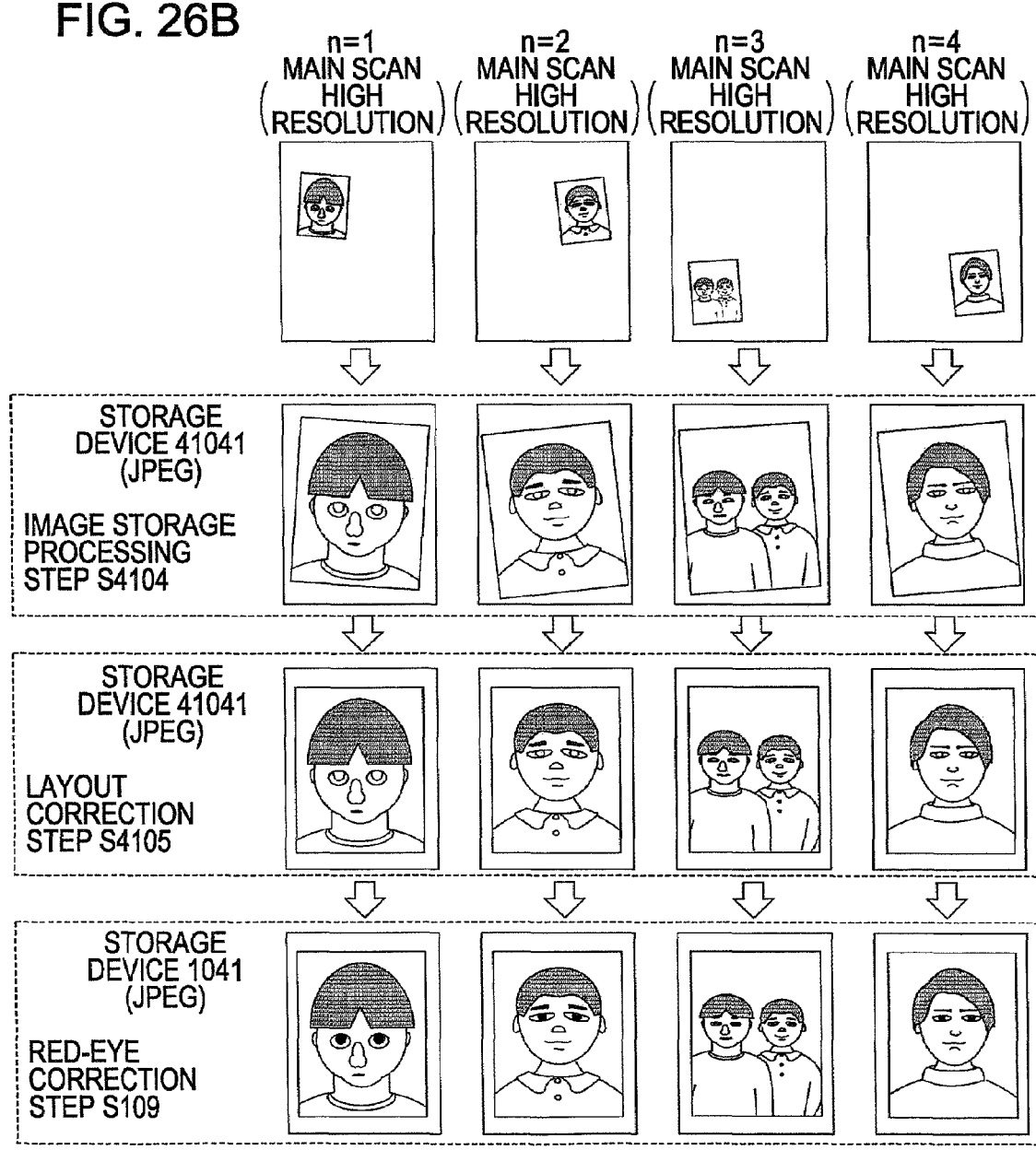

FIG. 29A
PRESCAN
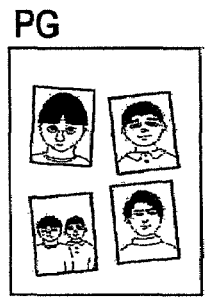
PG
FIG. 29B
MAIN SCAN
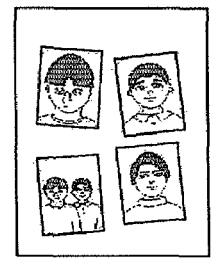
STORAGE DEVICE 42041
(JPEG)
IMAGE STORAGE
PROCESSING STEP S4204
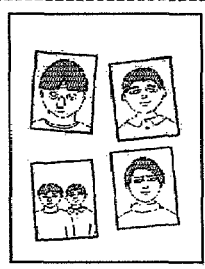
STORAGE DEVICE 42041
(JPEG)
LAYOUT CORRECTION
STEP S4205
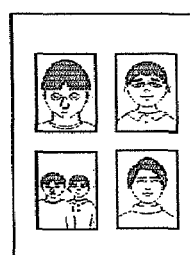
STORAGE DEVICE 42041
(JPEG)
RED-EYE CORRECTION
STEP S4209
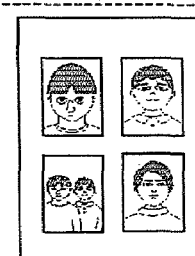

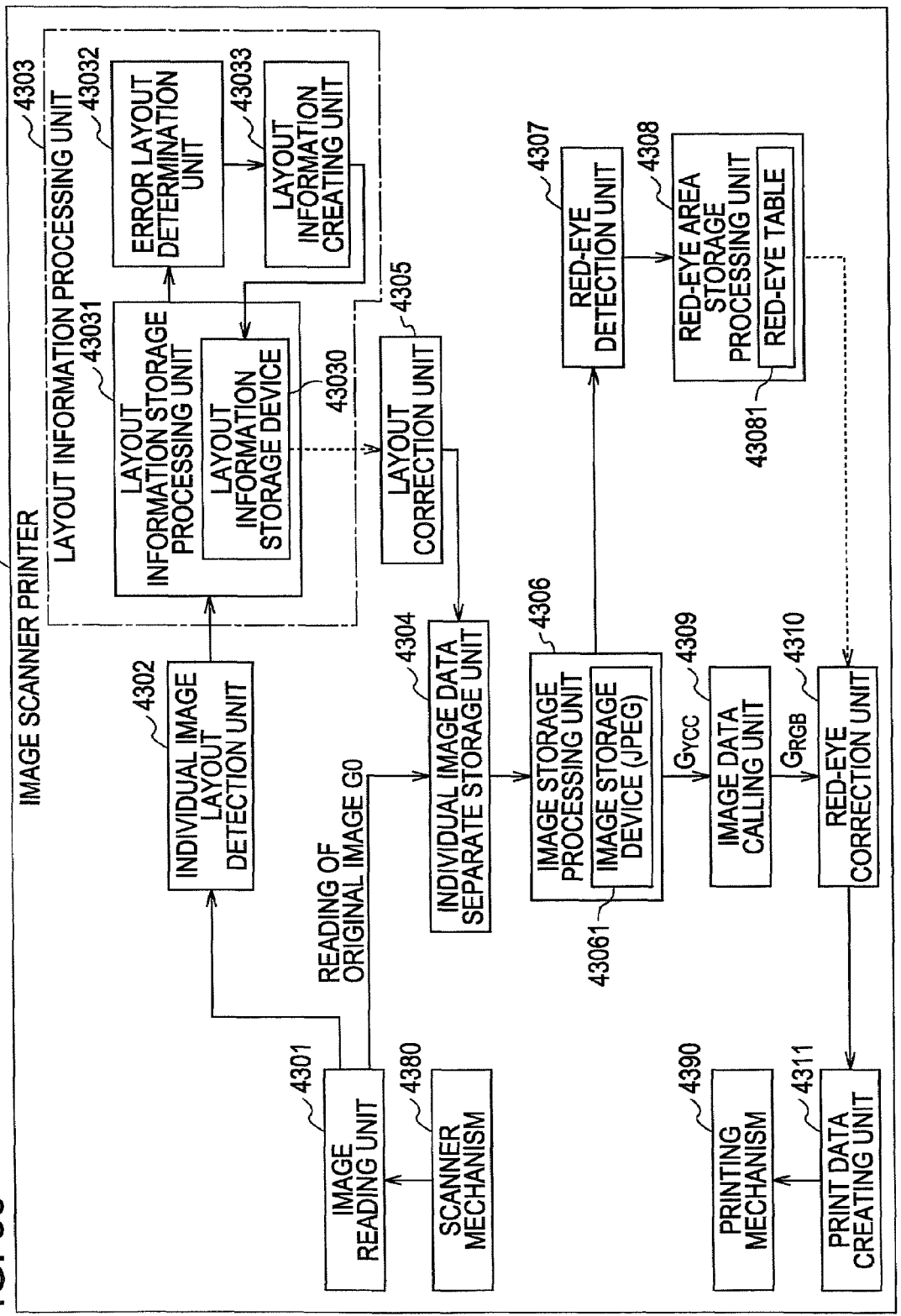

FIG. 32A
PRESCAN
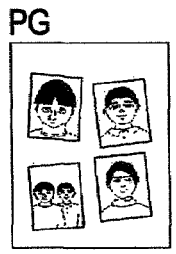
FIG. 32B
MAIN SCAN
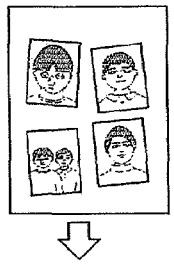
LAYOUT CORRECTION STEP S4305    LB    STORAGE DEVICE 3041
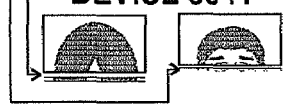
STORAGE DEVICE 43061 (JPEG)
IMAGE STORAGE PROCESSING STEP S4306
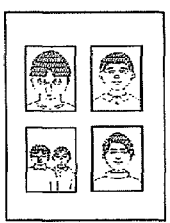
STORAGE DEVICE 43061 (JPEG)
RED-EYE CORRECTION STEP S4310

IMAGE SCANNER PRINTER

BACKGROUND

1. Technical Field

The present invention relates to an image scanner printer that is able to correct red-eye in an image read by a scanner and then to print out the image.

2. Related Art

In recent years, stand-alone printers, which can be used without being connected to a computer, become widely used. Some printers of this type have a slot for connecting a memory card or memory stick for digital camera, and others have installed an image scanner.

Some stand-alone printers are able to correct red-eye when they print out an image (JPEG image, RGB image, or the like) stored in a memory card. Red-eye is a phenomenon in which, when a human picture is taken with a flashlight in a dark place, the pupils of that person in the picture are sensitized to appear red (or gold). When a scanner is connected to a computer, and when a human image read by the scanner includes red-eye, it is possible to correct the red-eye with red-eye correction software that is installed in the computer.

The red-eye correction requires detection of a red-eye area and color correction of the red-eye area. Therefore, in advance of printing, the positions of eyes are pinpointed by recognizing a human face in an image, and it is determined whether red-eyes are present. When the red-eyes are present, their positions (red-eye area) are stored. Then, when printing, the color in the red-eye area of print data is replaced by black color, or the like.

In the stand-alone printer, when the red-eye correction is executed on an image stored in a memory card, image data are called from the memory card in units of a predetermined number of lines or in units of predetermined image blocks to an image processing portion. In this case, even when the capacity of a memory installed in the stand-alone printer is small, and even when no large work area can be ensured in the memory, it is possible to execute the red-eye correction by calling the image data little by little from the memory card.

On the other hand, a technology is known, in which when a plurality of photographs, or the like, including human faces are collectively read by one scanning operation, and when the layouts of images are incorrect (that is, when an image is tilted or out of position to the upper, lower, left, or right side), the layouts are automatically corrected, and, when red-eye is present, red-eye correction is executed and then printing is performed.

When the red-eye correction is executed on the image read by the scanner that is installed in a stand-alone scanner printer, the read image is once stored in a memory in the form of an image of RGB, or the like, and then red-eye detection and red-eye correction will be executed as in the case describe above.

However, in this case, the stand-alone scanner printer needs to have a large capacity memory, so that when the capacity of an internal memory is small, it is impossible to install a red-eye correction function.

When no large capacity memory is installed in a stand-alone scanner printer, by performing scanning at least twice with a scanner, it is not impossible to execute red-eye correction on an image read by the scanner.

For example, it may be possible that, only the detection of the position of red-eye is executed in a first scan (pre-scan), and red-eye correction is executed by referring to information regarding the detected position of red-eye in a second scan while data, on which the red-eye correction has been executed, are transferred to a printing mechanism.

Actually, when the second scan is executed, however, the red-eye area that has been detected in the first scan may vary from the red-eye area of an image that is read by the second scan because of a mechanical tolerance, or the like, of the scanner. As a result, there produces a problem that the red-eye correction is not properly executed and, therefore, a portion, which is not a red-eye portion, is replaced by black color, or the like. For the above reasons, in the existing stand-alone scanner printer, red-eye correction is not executed on an image that is read by the scanner.

Moreover, in a printing method, by which images are printed by automatically correcting the layouts of the images when the layouts are incorrect while executing red-eye correction for a picture including red-eye, because a normal printer has a small memory capacity, even when layout correction may be executed, there is a possibility that red-eye correction cannot be performed due to the memory capacity when red-eye is included in a picture (read image). On the other hand, even with a printer that is able to execute red-eye correction, when the printer tries to correct the incorrect layout of an image, which occurs when the scanner reads the image, there is a possibility that a red-eye area becomes out of position.

SUMMARY

An advantage of some aspects of the invention is that it provides an image scanner printer that is able to correct red-eye with a fewer times of driving of a scanner and is able to correct red-eye without a positional deviation at a red-eye portion and without requiring a large capacity memory.

In addition, another advantage of some aspects of the invention is to print out a plurality of images, including at least one picture whose subject is a human, by, after the images are read through a single scanner operation, automatically correcting the layouts of the images when the layouts are incorrect while executing red-eye correction when the at least one picture includes red-eye.

Basic Aspect

An image scanner printer according to an aspect of the invention provides the features described in the following paragraphs (1) and (2).

(1) An image scanner printer that reads an original image and that prints out the original image includes a red-eye detection unit, a YCC image storage processing unit, a YCC/RGB conversion unit, a red-eye correction unit, and a print data creating unit. The red-eye detection unit detects red-eye that is included in an image corresponding to a predetermined number of lines of RGB image data when the original image is read. The YCC image storage processing unit converts the predetermined number of lines of the RGB image data into YCC image data and stores all the data as one unit JPEG image. The YCC/RGB conversion unit converts the YCC image data into RGB image data in units of a line or in units of a predetermined number of lines. The red-eye correction unit executes red-eye correction on the RGB image data when an image corresponding to the converted RGB image data includes a red-eye area that is stored in a red-eye table. Among the RGB image data, the print data creating unit, for RGB image data on which the red-eye correction has been performed, creates print data from the RGB image data on which the red-eye correction has been performed, when the print data are created from the RGB image data.

(2) In the image scanner printer according to the aspect described in the paragraph (1), the red-eye correction unit, for executing red-eye correction on the image data, may store YCC image data, which will be converted by the YCC/RGB conversion unit, in a line data temporary storage processing unit (buffer memory or FIFO memory) in units of a predetermined number of lines.

A printing method according to another aspect of the invention provides the features described in the paragraphs (3) and (4).

(3) A printing method, using an image scanner, by which an original image is read and printed, includes a temporary storage processing step, a red-eye detection step, a red-eye area storage processing step, an RGB/YCC conversion step, a YCC image storage processing step, a YCC/RGB conversion step, a red-eye correction step, and a print data creating step. The temporary storage processing step stores a predetermined number of lines of RGB image data in a line data storage device when the original image is read. The red-eye detection step detects red-eye that is included in an image corresponding to the RGB image data. The red-eye area storage processing step, when the red-eye has been detected, stores a position of the red-eye in a red-eye table. The RGB/YCC conversion step converts the predetermined number of lines of the RGB image data into YCC image data. The YCC image storage processing step stores all the YCC image data in an image storage device as one unit JPEG image. The YCC/RGB conversion step converts the YCC image data into RGB image data in units of a line or in units of a predetermined number of lines. The red-eye correction step executes red-eye correction on the RGB image data when an image corresponding to the converted RGB image data includes the red-eye area that is stored in the red-eye table. Among the converted RGB image data, the print data creating step, for RGB image data on which no red-eye correction has been executed, creates print data from the RGB image data on which no red-eye correction has been executed and, for RGB image data on which the red-eye correction has been executed, creates print data from the RGB image data on which the red-eye correction has been executed, and transfers the print data to the printing mechanism.

(4) In the printing method according to the aspect described in the paragraph (3), the temporary storage processing step may be executed by a buffer memory or a FIFO memory.

First Aspect

An image scanner printer according to a first aspect of the invention provides the features described in the following paragraphs (A1) to (A3).

(A1) An image scanner printer that reads an original image and that prints out the original image includes an image storage processing unit, a red-eye detection unit, a red-eye correction unit, and a print data creating unit. The image storage processing unit stores image data of the read original image. In a first operation for calling the image data, the red-eye detection unit detects red-eye that is included in an image corresponding to a predetermined number of lines of image data. In a second operation for calling the image data, when an image corresponding to the called image data includes a red-eye area, the red-eye correction unit executes red-eye correction on the image data. When print data are created from the image data, the print data creating unit, for image data on which the red-eye correction has been executed, creates print data from the image data on which the red-eye correction has been executed.

(A2) In the image scanner printer according to the aspect described in the paragraph (A1), the image data that are stored by the image storage processing unit are RGB image data.

(A3) In the image scanner printer according to the aspect described in the paragraph (A1), the image data that are stored by the image storage processing unit are YCC image data.

A printing method according to another first aspect of the invention provides the features described in the following paragraphs (A4) to (A6).

(A4) A printing method, by which an original image is read and printed, includes an image storage processing step, an image data calling step, an image data temporary storage step, a red-eye detection step, a red-eye area storage step, a red-eye correction step, and a print data creating step. When the original image is read, the image storage processing step stores a predetermined number of lines of image data in an image storage device as one unit image. The image data calling step executes an operation twice in total for calling image data from the image storage device in units of a predetermined number of lines or in units of processes. In a first operation of the image data calling step, the image data temporary storage step stores a predetermined number of lines of image data in a line data storage device. The red-eye detection step detects red-eye that is included in an image corresponding to the image data stored in the line data storage device. When the red-eye has been detected, the red-eye area storage step stores a position of the red-eye in a red-eye table. In a second operation of the image data calling step, when the image corresponding to the called image data includes the red-eye area that is stored in the red-eye table, the red-eye correction step executes red-eye correction on the image data. In the second operation, among the called image data, the print data creating step, for image data on which no red-eye correction has been executed, creates print data from the image data on which no red-eye correction has been executed and, for image data on which the red-eye correction has been executed, creates print data from the image data on which the red-eye correction has been executed.

(A5) In the printing method according to the aspect described in the paragraph (A4), the image data are RGB image data.

(A6) A printing method, by which an original image is read and printed, includes an RGB/YCC conversion step, a YCC image storage step, a YCC/RGB conversion step, an image data temporary storage step, a red-eye detection step, a red-eye correction step, and a print data creating step. When the original image is read, the RGB/YCC conversion step converts a predetermined number of lines of RGB image data into YCC image. The YCC image storage step sequentially accumulates the YCC image and stores the image in an image storage device as a YCC image. The YCC/RGB conversion step executes an operation twice in total in which the YCC image is called from the image storage device in units of a predetermined number of lines or in units of processes and converted into RGB image data. In a first operation of the YCC/RGB conversion step, the image data temporary storage step stores a predetermined number of lines of the RGB image data in a line data storage device. The red-eye detection step detects red-eye that is included in an image corresponding to the RGB image data that are stored in the line data storage device. When the red-eye has been detected, the red-eye area storage step stores a position of the red-eye. In a second operation of the YCC/RGB conversion step, when an image corresponding to the called RGB image data includes the red-eye area, the red-eye correction step executes red-eye correction on the RGB image data. In the first operation of the YCC/RGB conversion step, among the called RGB image data, the print data creating step, for RGB image data on which no red-eye correction has been executed, creates print data from the RGB image data on which no red-eye correction has been executed and, for RGB image data on which the red-eye correction has been executed, creates print data from the RGB image data on which the red-eye correction has been executed.

Second Aspect

An image scanner printer according to a second aspect of the invention provides the features described in the following paragraphs (B1) to (B3).

(B1) An image scanner printer that reads an original image and that prints out the original image includes an image storage processing unit, a red-eye detection unit, a red-eye correction unit, and a print data creating unit. The image storage processing unit stores image data of the read original image. In a first operation for calling the image data, the red-eye detection unit detects red-eye that is included in an image corresponding to a predetermined number of lines of the image data. In a second operation for calling the image data, when an image corresponding to the called image data includes a red-eye area, the red-eye correction unit executes red-eye correction on the image data. When the print data are created from the image data, the print data creating unit, for image data on which the red-eye correction has been executed, creates print data from the image data on which the red-eye correction has been executed.

(B2) In the image scanner printer according to the aspect described in the paragraph (B1), the image data stored by the image storage processing unit are RGB image data.

(B3) In the image scanner printer according to the aspect described in the paragraph (B1), the image data stored by the image storage processing unit are YCC image data.

A printing method according to another second aspect of the invention provides the features described in the following paragraphs (B4) and (B5).

(B4) A printing method, by which an original image is read and printed, includes a line data temporary storage processing step, a red-eye detection step, a red-eye area storage processing step, an image storage processing step, an image data calling step, a red-eye correction step, and a print data creating step. When the original image is read, the line data temporary storage processing step stores a predetermined number of lines of image data in a line data storage device. The red-eye detection step detects red-eye that is included in an image corresponding to the image data stored in the line data storage device. When the red-eye has been detected, the red-eye area storage processing step stores a position of the red-eye in a red-eye area table. The image storage processing step sequentially calls the image data stored in the line data storage device and stores all the data in an image storage device as one unit image. The image data calling step calls image data in units of a line or in units of a predetermined number of lines on the one unit image stored in the image storage device. When an image corresponding to the image data called in the image data calling step includes the red-eye area, the red-eye correction step executes red-eye correction on the image data. Among the image data called in the image data calling step, the print data creating step, for image data on which no red-eye correction has been executed, creates print data from the image data on which no red-eye correction has been executed and, for image data on which the red-eye correction has been executed, creates print data from the image data on which the red-eye correction has been executed.

(B5) In the printing method according to the aspect described in the paragraph (B4), the image data are RGB image data.

Third Aspect

An image scanner printer according to a third aspect provides the features described in the following paragraphs (C1) and (C2).

(C1) An image scanner printer that reads an original image and that prints out the original image includes a red-eye detection unit, an image storage processing unit, a red-eye correction unit, and a print data creating unit. When the original image is read, the red-eye detection unit detects red-eye that is included in an image corresponding to a predetermined number of lines of image data. The image storage processing unit stores the original image as one unit image. The red-eye correction unit calls image data in units of a line or in units of a predetermined number of lines on the stored one unit image and, when an image corresponding to the called image data includes an area of the red-eye, executes red-eye correction on the image data. When print data are created from the image data, the print data creating unit, for image data on which the red-eye correction has been executed, creates print data from the image data on which the red-eye correction has been executed.

(C2) In the image scanner printer according to the aspect described in the paragraph (C1), the red-eye correction unit, when red-eye correction is executed on the image data, calls image data in units of a line or in units of a predetermined number of lines from the stored one unit image into a line data temporary storage processing unit (buffer memory or FIFO memory).

A printing method according to another third aspect of the invention provides the features described in the paragraphs (C3) to (C6).

(C3) A method, by which printing is performed after sequentially reading individual images through pre-scan and through main scan that is performed the same number of times as the number of the individual images included in an original image, includes an individual image layout detection step, a layout information processing step, an image storage processing step, a layout correction step, a red-eye detection step, a red-eye area storage processing step, a red-eye correction step, and a print data creating step. When the pre-scan is performed, the individual image layout detection step detects layouts of the individual images. When at least one of the individual images is read incorrectly in layout, the layout information processing step creates layout information in which the at least one of the individual images is corrected in layout. The image storage processing step stores image data of the individual image corresponding to the number of times the main scan is performed. The layout correction step detects whether the individual image is read incorrectly in layout by referring to the layout information and, when the individual image is read incorrectly in layout, executes a layout correction process on image data corresponding to that individual image so as to be corrected in layout. The red-eye detection step detects whether an image corresponding to image data of the individual image stored in the image storage device includes red-eye. When the red-eye has been detected, the red-eye area storage processing step stores a red-eye area in a red-eye table. The red-eye correction step calls image data of the individual image from the image storage device portion by portion and, when the image data include the red-eye area, executes red-eye correction on the image data. Among the called image data, the print data creating step, for image data on which no red-eye correction has been executed, creates print data from the image data on which no red-eye correction has been executed and, for image data on which the red-eye correction has been executed, creates print data from the image data on which the red-eye correction has been executed.

(C4) A method, by which an original image including a plurality of individual images is read and printed, includes an individual image layout detection step, a layout information processing step, an image storage processing step, a layout correction step, a red-eye detection step, a red-eye area storage processing step, a red-eye correction step, and a print data creating step. When pre-scan is performed, the individual image layout detection step that detects layouts of the individual images. When at least one of the individual images is read incorrectly in layout, the layout information processing step creates layout information in which the at least one of the individual images is corrected in layout. The image storage processing step stores image data of the original image, which has been read through main scan, in an image storage device. The layout correction step detects whether the individual images within the original image are read incorrectly in layout by referring to the layout information and, when the individual images are read incorrectly in layout, executes a layout correction process on the image data of the individual images so as to be corrected in layout. The red-eye detection step detects whether red-eye is included in images corresponding to the image data of the individual images within the original image stored in the image storage device. When the red-eye has been detected, the red-eye area storage processing step stores a red-eye area in a red-eye table. The red-eye correction step calls image data of the original image, which are stored in the image storage device, portion by portion from the image storage device and, when the image data include the red-eye area, executes red-eye correction on the image data. Among the called image data, the print data creating step, for image data on which no red-eye correction has been executed, creates print data from the image data on which no red-eye correction has been executed and, for image data on which the red-eye correction has been executed, creates print data from the image data on which the red-eye correction has been executed.

(C5) A method, by which an original image including a plurality of individual images is read and printed, includes an individual image layout detection step, a layout information processing step, an individual image data separate storage step, a layout correction step, an image storage processing step, a red-eye detection step, a red-eye area storage processing step, a red-eye correction step, and a print data creating step. When pre-scan is performed, the individual image layout detection step that detects layouts of the individual images. When at least one of the individual images is read incorrectly in layout, the layout information processing step creates layout information in which the at least one of the individual images is corrected in layout. When main scan is performed, the individual image data separate storage step stores a predetermined number of lines of image data and separates the image data into image data of each individual image on the basis of the layout information and then stores the separated image data. The layout correction step detects whether at least one of the individual images within the original image is read incorrectly in layout by referring to the layout information and, when the at least one of the individual images is read incorrectly in layout, executes a layout correction process on the image data so as to be corrected in layout. The image storage processing step stores the individual images that are separated in the individual image data separate storage step in an image storage device. The red-eye detection step detects whether an image corresponding to the image data of each of the individual images within the original image, which are stored in the image storage device, includes red-eye. When the red-eye has been detected, the red-eye area storage processing step stores a red-eye area in a red-eye table. The red-eye correction step calls the image data of the original image, stored in the image storage device, portion by portion from the image storage device and, when the image data include the red-eye area, executes red-eye correction. Among the called image data, the print data creating step, for image data on which no red-eye correction has been executed, creates print data from the image data on which no red-eye correction has been executed and, for image data on which the red-eye correction has been executed, creates print data from the image data on which the red-eye correction has been executed.

(C6) In the method according to the aspect described in any one of the paragraphs (C3 to (C5), the layout information processing step includes a layout information storage processing step, an incorrect layout determination step, and a layout information creating step. The layout information storage processing step stores the layouts of the individual images, which have been detected in the individual image layout detection step, in a layout information storage device as layout information that at least includes positional information and tilt angle information. The incorrect layout determination step determines whether the individual images are read incorrectly in layout. When it is determined that the individual images are read incorrectly in layout, the layout information creating step creates layout information in which the individual images are corrected in layout, and stores the layout information in the layout information storage device.

BRIEF DESCRIPTION OF THE DRAWINGS

The invention will be described with reference to the accompanying drawings, wherein like numbers reference like elements.

FIG. 2A is a view that shows 16 lines on an original image. FIG. 2B is a view that shows a state where a 16 line image is expanded into a picture image. FIG. 2C is a view that shows a state where a 16 line image is expanded into a picture image. FIG. 2D is a view that shows a printed image on which red-eye correction is executed.

FIG. 3A and FIG. 3B are views of a line buffer in which line data are stored in units of 16 lines. FIG. 3A is a view that shows a state where a fifth line data is being stored. FIG. 3B is a view that shows a state where an RGB/YCC conversion unit calls data in units of 8 lines.

FIG. 5 is a view that shows a red-eye table.

FIG. 7A to FIG. 7C are views that supplements the flowchart of FIG. 6. FIG. 7A is a view that illustrates a process executed in step S1103 of FIG. 6. FIG. 7B is a view that illustrates a process executed in step S1109. FIG. 7C is a view that illustrates a process executed in step S1111 of FIG. 6 and a process executed in step S1113.

FIG. 10A is a view that shows 16 lines on an original image. FIG. 10B is a view that shows a state where a 16 line image is expanded into a picture image. FIG. 10C is a view that shows a state where a 16 line image is expanded into a picture image. FIG. 10D is a view that shows a printed image on which red-eye correction is executed.

FIG. 11 is a view that shows a red-eye table.

FIG. 21 is a view that shows a red-eye area table.

FIG. 23A is a view that illustrates a process executed in step S303. FIG. 7B is a view that illustrates a process executed in step S309. FIG. 7C is a view that illustrates a process executed in step S311 and a process executed in step S313.

FIG. 26A is a view that shows an example of a pre-scanned image. FIG. 26B is a view that shows an example of a process executed in image storage processing step, a process executed in layout correction step, and a process executed in red-eye correction step, in main scan.

FIG. 29A is a view that shows an example of a pre-scanned image. FIG. 29B is a view that shows an example of a process executed in image storage processing step, a process executed in layout correction step, and a process executed in red-eye correction step, in main scan.

FIG. 30 is a block diagram illustrating a third exemplary embodiment of an image scanner printer according to the third aspect of the invention.

FIG. 32A is a view that shows an example of a pre-scanned image. FIG. 32B is a view that shows an example of a process executed in layout correction step, a process executed in image storage processing step, and a process executed in red-eye correction step, in main scan.

DESCRIPTION OF EXEMPLARY EMBODIMENTS

Exemplary Embodiment of Basic Aspect

Figure 1:
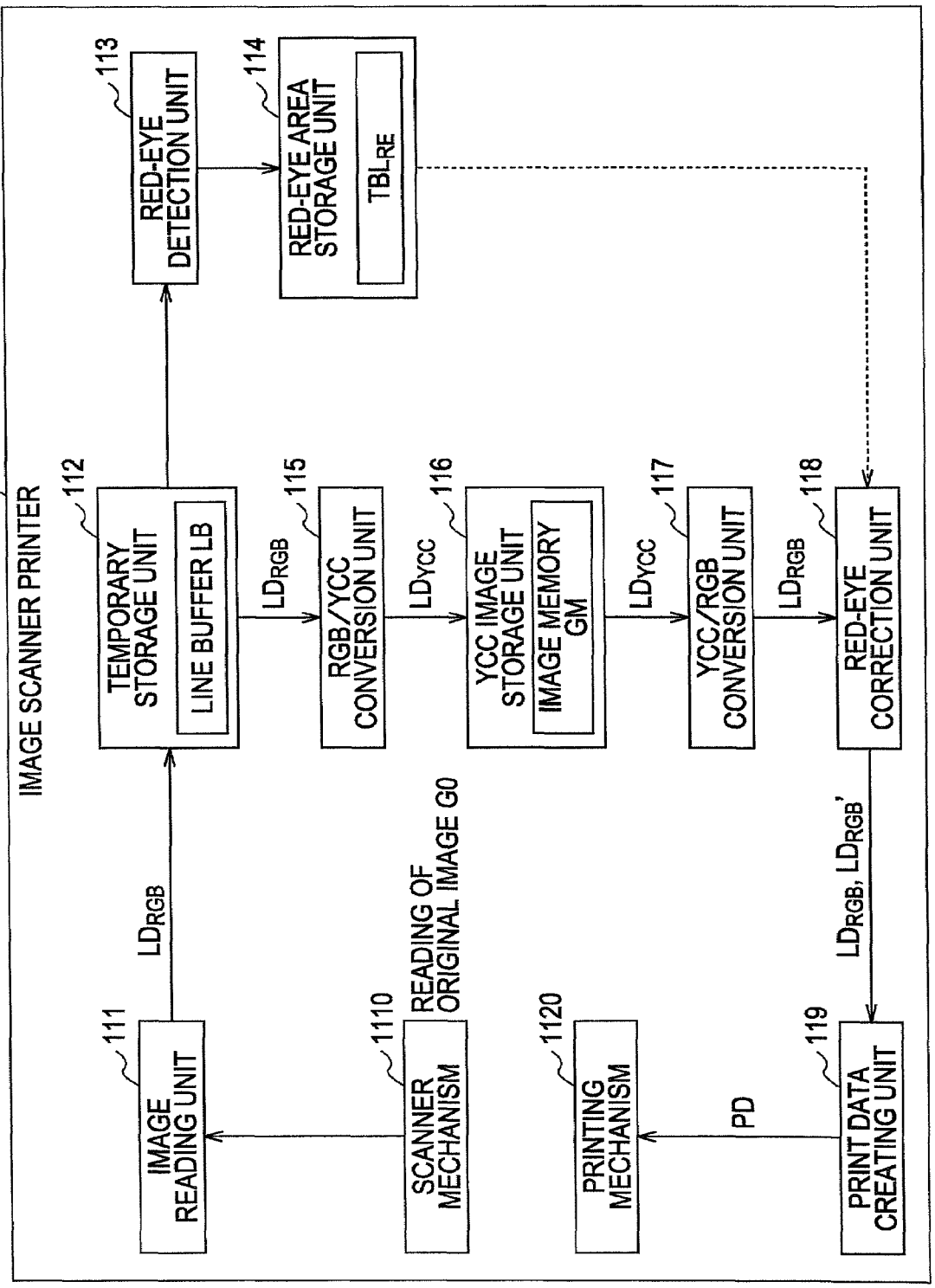
FIG. 1 is a block diagram illustrating one exemplary embodiment of an image scanner printer according to the invention.

FIG. 1 is a block diagram illustrating one exemplary embodiment of an image scanner printer according to the invention. As shown in FIG. 1, the image scanner printer 11 is provided with a scanner mechanism 1110 that reads an original image G0 and a printing mechanism 1120 that performs printing. The image scanner printer 11 includes an image reading unit 111, a line data temporary storage processing unit 112, a red-eye detection unit 113, a red-eye area storage processing unit 114, an RGB/YCC conversion unit 115, a YCC image storage processing unit 116, a YCC/RGB conversion unit 117, a red-eye correction unit 118, and a print data creating unit 119.

The image reading unit 111 drives the scanner mechanism 1110 and acquires RGB image data $LD_{RGB}$ of the original image G0, which are read by the scanner mechanism 1110. The line data temporary storage processing unit 112, when the scanner mechanism 1110 reads an image, stores RGB image data $LD_{RGB}$ of a predetermined number of lines (8 lines or 16 lines in the present exemplary embodiment), which are transmitted from the image reading unit 111, in a data line storage device (a line buffer LB in the present exemplary embodiment). FIG. 2A is a view that shows 16 lines on the original image G0. The line buffer LB may have configurations shown in FIG. 3A and FIG. 3B. In this case, line data are stored in units of 16 lines. Note that FIG. 3A is a view that shows a state where a fifth line (n=5) is being stored in the line buffer LB. In addition, FIG. 3B is a view that shows a state where 16 line RGB image data $LD_{RGB}$ are divided into 8 lines each and then transferred to the RGB/YCC conversion unit 115.

Figure 4:
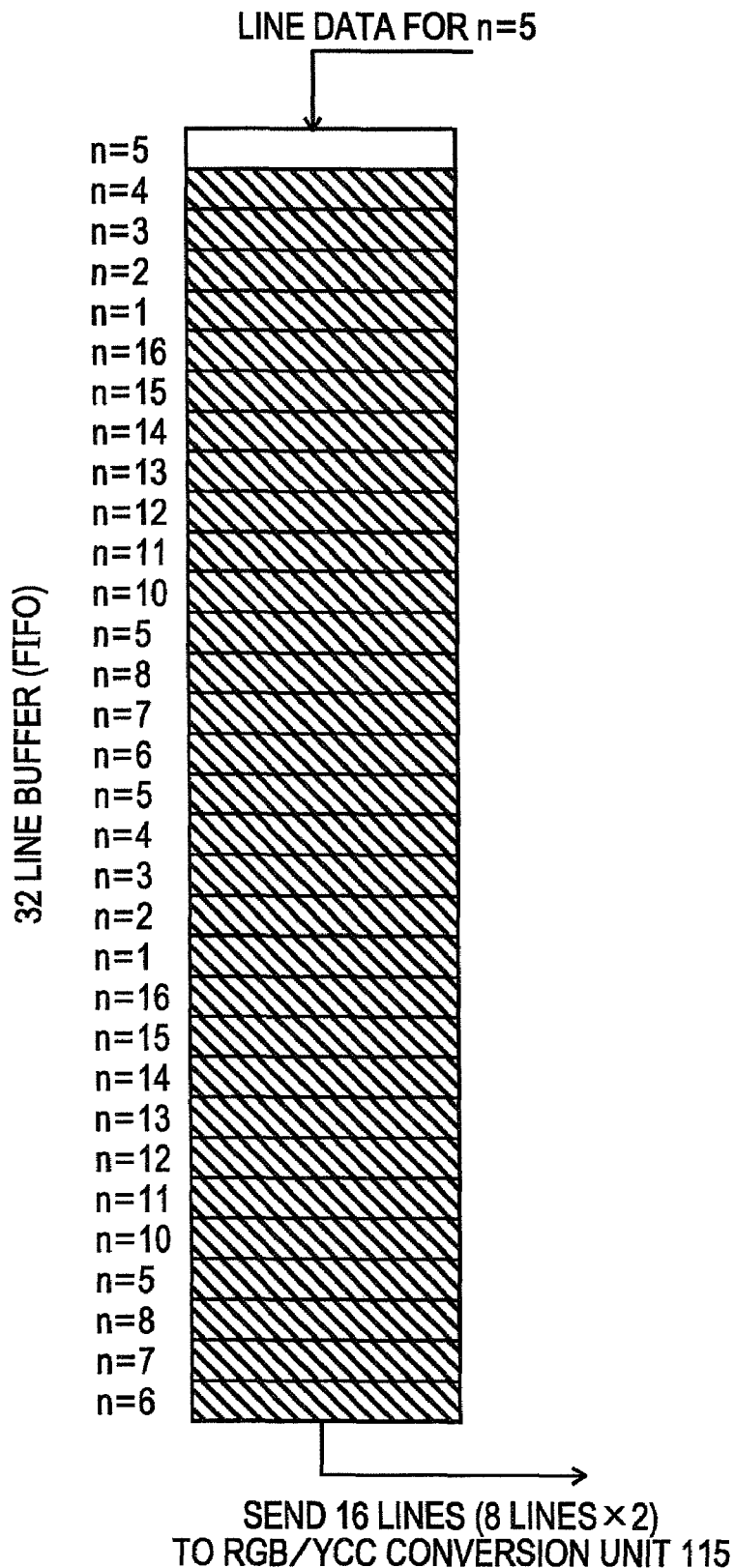
FIG. 4 is a view of a FIFO line buffer 32 that stores 32 line data, showing a state where a fifth line data is being stored.

In addition, the line buffer LB may have a FIFO configuration as shown in FIG. 4. In this case, a read line will be stored line by line into the line buffer LB by pushing the lines stored in the line buffer LB. In FIG. 4, the line buffer LB is formed of 32 lines. The pointer of the line buffer LB is reset every 16 lines in order to execute red-eye detection in units of 16 lines (see S1101 and S1105 of the flowchart of FIG. 6, which will be described later). Note that FIG. 4 is a view that shows a state where a fifth line (n=5) is being stored in the line buffer LB.

The red-eye detection unit 113 detects red-eye that is included in the RGB image data $LD_{RGB}$ stored in the line buffer LB. The red-eye detection unit 113, when the line buffer LB has a configuration as shown in FIG. 3A and FIG. 3B, expands a 16 line image into a picture image. The red-eye detection unit 113, when the line buffer LB has a configuration as shown in FIG. 4, expands a 32 line image into a picture image. Then, a known red-eye detection is executed.

In red-eye detection, an object included in the expanded picture image is extracted, and the extracted object is then compared with a shape pattern of red-eye, a shape pattern of a peripheral portion of red-eye, or a face pattern, which is stored in a storage device (ROM) (not shown). When the line buffer LB has a configuration as shown in FIG. 4, it is possible to accurately perform red-eye detection even when the eyes of a human extends over adjacent groups of processing unit 16 lines. FIG. 2B is a view that shows a state where a 16 line image is expanded into a picture image. FIG. 2C is a view that shows a state where a 32 line image is expanded into a picture image. When red-eye is detected by the red-eye detection unit 113, the position of the red-eye is stored in a red-eye table $TBL_{RE}$ by the red-eye area storage processing unit 114. As shown in FIG. 5, the number of the red-eye, the center of the red-eye center, the diameter of the red-eye, and the like, are recorded in the red-eye table $TBL_{RE}$.

The RGB image data $LD_{RGB}$ stored in the line buffer LB are called by the RGB/YCC conversion unit 115 and converted into YCC image data $LD_{YCC}$. When the line buffer LB has a configuration shown in FIG. 3A and FIG. 3B, 16 line RGB image data $LD_{RGB}$ are transferred to the RGB/YCC conversion unit 115 before writing of the next 16 lines is initiated. When the line buffer LB has a FIFO configuration shown in FIG. 4, the 32 line preceding RGB image data $LD_{RGB}$ are pushed out by newly read RGB image data $LD_{RGB}$ and thus sequentially transferred to the image memory GM. Note that, although there are no newly read RGB image data $LD_{RGB}$, the last 32 lines of the original image G0 are sequentially transferred to the image memory.

The YCC image storage processing unit 116 writes the called YCC image data $LD_{YCC}$ in an image storage device (the image memory GM in the present exemplary embodiment) and stores the data as one unit image (here, JPEG image $G_{JPG}$). The YCC/RGB conversion unit 117 calls YCC image data $LD_{YCC}$ in units of a line or in units of a predetermined number of lines on the JPEG image $G_{JPG}$ stored in the image memory GM, and converts the data into RGB image data $LD_{RGB}$. When the image of the RGB image data $LD_{RGB}$, converted by the YCC/RGB conversion unit 117, includes a red eye area that has been stored in the red-eye table $TBL_{RE}$, the red-eye correction unit 118 replaces a pixel color in the red-eye area by black color, or the like, on the RGB image data $LD_{RGB}$. Here, the corrected RGB image data are denoted by $LD_{RGB}'$.

The print data creating unit 119, among the RGB image data $LD_{RGB}$ converted by the YCC/RGB conversion unit 117, (1) for RGB image data $LD_{RGB}$ on which no red-eye correction has been executed by the red-eye correction unit 118, creates print data PD from the RGB image data $LD_{RGB}$ and (2) for RGB image data $LD_{RGB}'$ on which red-eye correction has been executed by the red-eye correction unit 118, creates print data PD from the RGB image data $LD_{RGB}'$, and then transfers these print data PD to the printing mechanism 1120.

Figure 6:
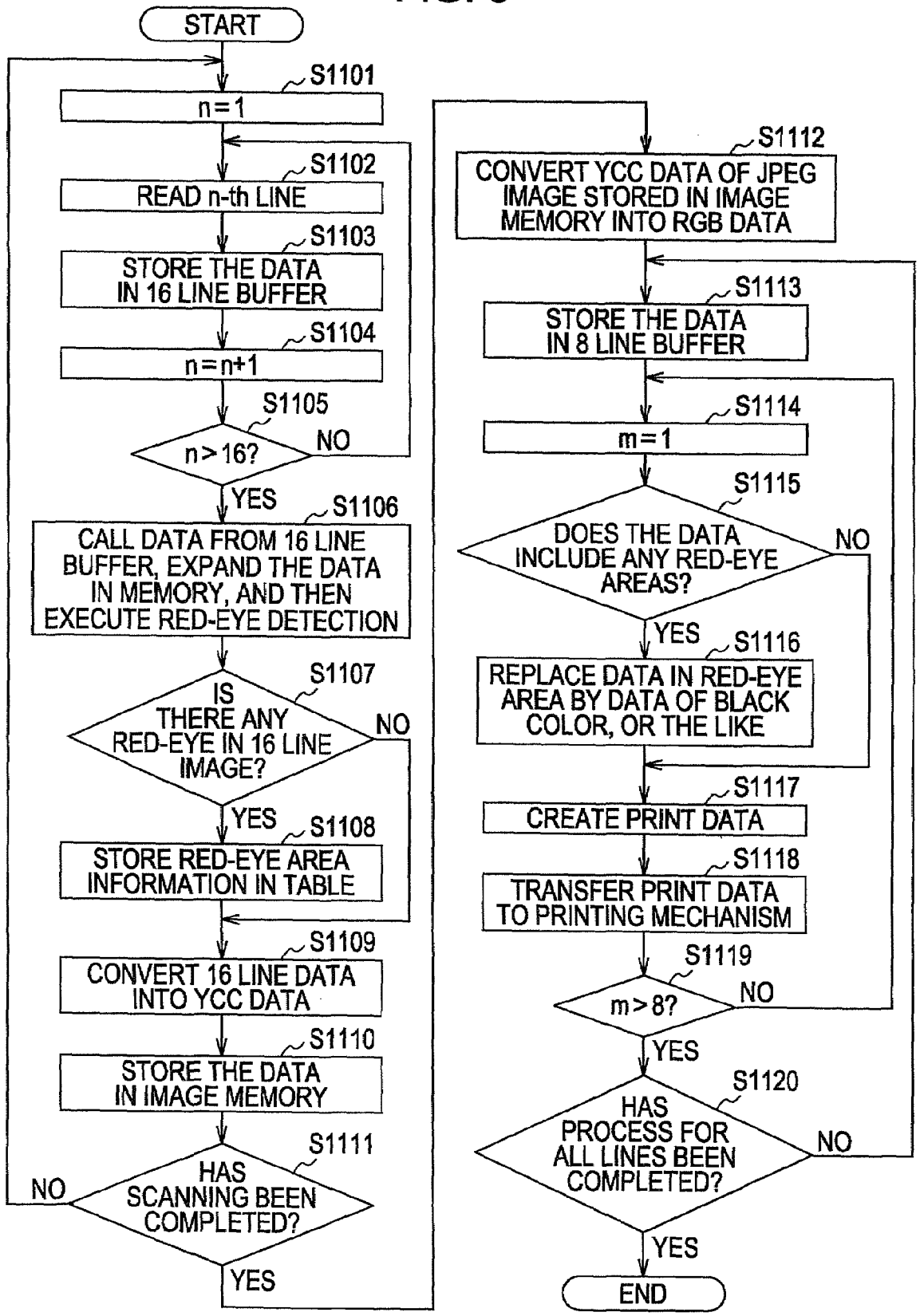
FIG. 6 is a flowchart that shows the operation of the image scanner printer.

The operation of the image scanner printer 11 will now be described in detail with reference to the flowchart of FIG. 6. In FIG. 6, the image reading unit 111 ensures an area in a line data storage device (16-line line buffer LB in the present exemplary embodiment), a reading line pointer is set to n=1 (S1101).

The original image G0 is read line by line by the scanner mechanism 1110 (S1102). When the RGB image data $LD_{RGB}$ of each line are stored in the line buffer LB by the line data temporary storage processing unit 112 (S1103), n is incremented (n=n+1) (S1104). FIG. 7A is a view that shows a state where, in S1103, the RGB image data $LD_{RGB}$ are being stored in the line buffer LB.

The processes in S1102 to S1104 are repeatedly executed until n=16 ("NO" in S1105). When reading of 16 lines is completed ("YES" in S1105), the 16 line RGB image data $LD_{RGB}$ are called from the line buffer LB to a predetermined memory space and expanded into a picture image (see FIG. 2B), and then red-eye included in this expanded picture image is detected by the red-eye detection unit 113 (S1106). When red-eye has been detected in S1106 ("YES" in S1107), the red-eye area storage processing unit 114 stores the position of the red-eye in the red-eye table $TBL_{RE}$ (S1108).

When no red-eye has been detected in S1107 ("NO" in S1107), or when the position of the red-eye has been stored in the red-eye table $TBL_{RE}$ in the case where the red-eye has been detected in S1106 (S1108), the 8 line RGB image data $LD_{RGB}$ stored in the line buffer LB is converted into YCC image data $LD_{YCC}$ by the RGB/YCC conversion unit 115 (S1109). That is, the YCC image data $LD_{YCC}$ are created by executing DCT conversion, quantization, and Huffman compression on the RGB image data $LD_{RGB}$ in units of 8 lines. The YCC image data $LD_{YCC}$ are stored in the image memory GM (S1110). FIG. 7B is a view that shows a state where, in S1109, 16 line RGB image data $LD_{RGB}$ are executed with RGB/YCC conversion and then stored in the image memory GM.

Until the scanning is completed, the processes in S1101 to S1110 are repeatedly executed ("NO" in S1111). Upon completion of the scanning, one unit image (here, JPEG image $G_{JPG}$) is stored in the image memory GM. When the scanning has been completed ("YES" in S1111), the YCC image data $LD_{YCC}$ are called in units of 8 lines by the YCC/RGB conversion unit 117 on the JPEG image $G_{JPG}$ that is stored in the image memory GM and then converted into the RGB image data $LD_{RGB}$ (S1112). The RGB image data $LD_{RGB}$ are saved in an 8 line buffer (not shown) (S1113), and a pointer m of the 8 line buffer is initialized (m=1) (S1114).

The red-eye correction unit 118 calls the RGB image data $LD_{RGB}$ stored in the 8 line buffer and, when an image corresponding to the RGB image data includes a red-eye area that is stored in the red-eye table $TBL_{RE}$ ("YES" in S1115), replaces the RGB image data $LD_{RGB}$ by data of black color, or the like (S1116).

FIG. 7C is a view that shows a state where the YCC image data $LD_{YCC}$ of the JPEG image $G_{JPG}$, which are stored in the image memory GM, are called line by line in S1113 and red-eye correction is executed on the RGB image data $LD_{RGB}$ in S1116.

Then, among the RGB image data $LD_{RGB}$, the print data creating unit 119 (1) for RGB image data $LD_{RGB}$ on which no red-eye correction has been executed by the red-eye correction unit 118, creates print data PD from the RGB image data $LD_{RGB}$ (see "NO" in S1115) and (2) for RGB image data $LD_{RGB}'$ on which the red-eye correction has been executed by the red-eye correction unit 118, creates print data PD from the RGB image data $LD_{RGB}'$ (S1117), and then transfers these print data PD to the printing mechanism 1120 (S1118). FIG. 2D is a view that shows the printed image G0 on which red-eye correction has been executed.

The processes in S1113 to S1118 are repeatedly executed until m=8 ("NO" in S1119) and, when m becomes 8, the next 8 lines are called from the image memory GM ("YES" in S1119, "NO" in S1120: S1113 to S1118). When the processes for all the lines have been completed ("YES" in S1120), all processes are completed.

According to the image scanner printer of the basic aspect of the invention, when the RGB image data are read, red-eye detection is executed and a red-eye area is stored in a table. It is attempted to reduce the usage of memory capacity by storing the read RGB image data through conversion into JPEG data, and red-eye correction is executed when the YCC image data are read line by line as the RGB image data at the time when the data are transmitted to the printer. Thus, it is possible to reduce the number of driving of the scanner and it is possible to execute red-eye correction without any positional deviation. Moreover, it is possible to perform red-eye correction with a small amount of memory resources.

Exemplary Embodiment of First Aspect

Figure 8:
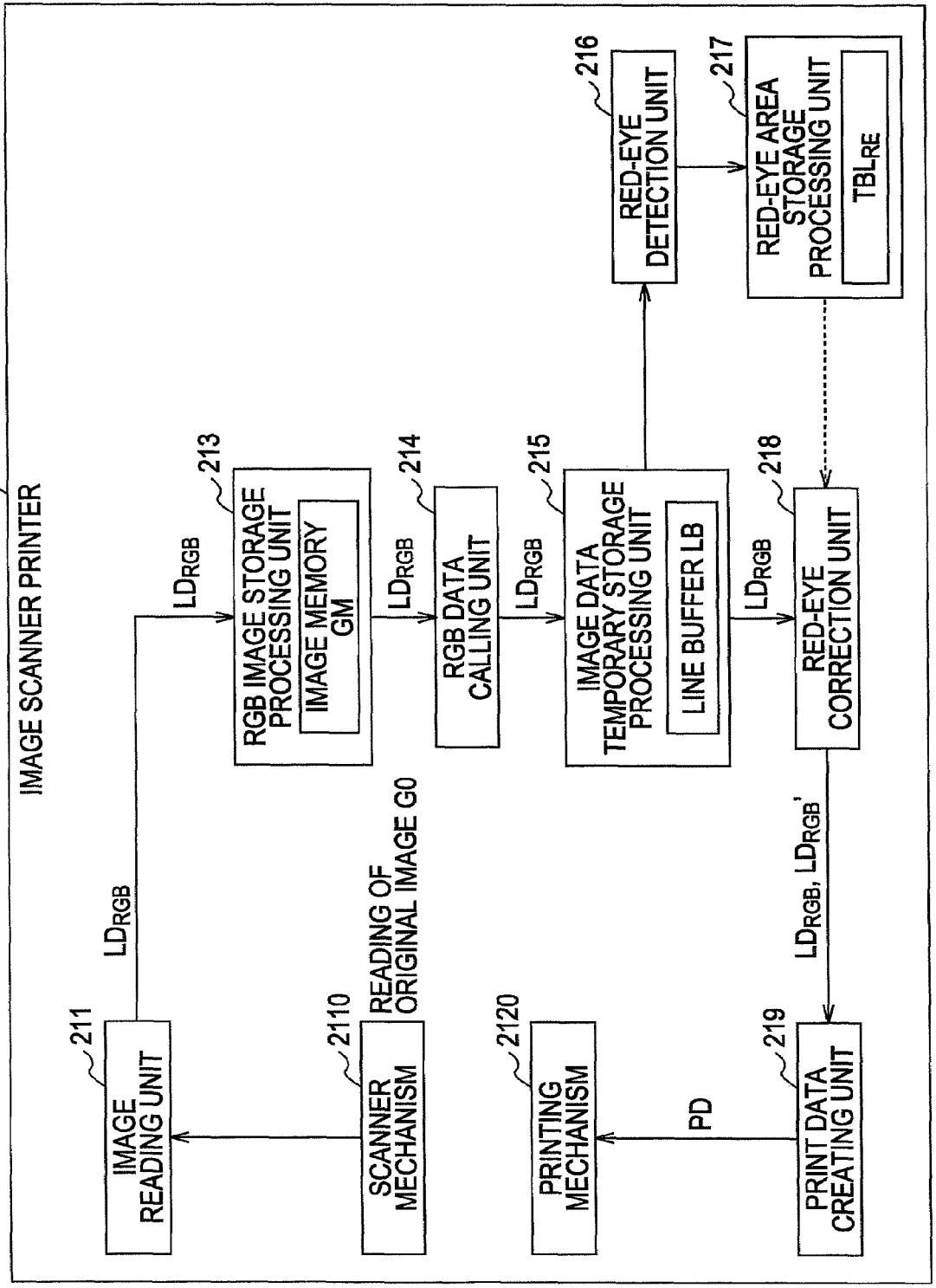
FIG. 8 is a block diagram illustrating one embodiment of an image scanner printer according to the invention.

FIG. 8 is a block diagram illustrating one exemplary embodiment of an image scanner printer according to a first aspect of the invention. As shown in FIG. 8, the image scanner printer 21 is provided with a scanner mechanism 2110 that reads an original image G0 and a printing mechanism 2120 that performs printing. The image scanner printer 21 further includes an image reading unit 211, an RGB image storage unit 213, an RGB image data calling unit 214, an image data temporary storage unit 215, a red-eye detection unit 216, a red-eye area storage processing unit 217, a red-eye correction unit 218, and a print data creating unit 219.

The image reading unit 211 drives the scanner mechanism 2110 and acquires RGB image data $LD_{RGB}$ of the original image G0, which are read by the scanner mechanism 2110. The YCC image storage unit 213 sequentially accumulates the RGB image data $LD_{RGB}$ and stores the data in an image storage device (image memory GM in the present exemplary embodiment) as a JPEG image. The RGB image data calling unit 214 executes an operation twice in total in which the RGB image data $LD_{RGB}$ are called in units of a line or in units of a predetermined number of lines or in units of processes on the RGB image $G_{RGB}$ stored in the image memory GM.

The image data temporary storage unit 215 stores a predetermined number of lines of the RGB image data $LD_{RGB}$, which have been called by the RGB image data calling unit 214, in a line data storage device (line buffer LB in the present exemplary embodiment). The red-eye detection unit 216 detects red-eye that is included in the image of the RGB image data $LD_{RGB}$ that are stored in the line buffer LB.

In red-eye detection, an object included in the expanded picture image is extracted, and the extracted object is then compared with a shape pattern of red-eye, a shape pattern of a peripheral portion of red-eye, or a face pattern, which is stored in a storage device (ROM) (not shown). The red-eye detection unit 216 is able to expand an image of an appropriate number of lines, such as 16 lines, 32 lines, or the like, into a picture image in accordance with the amount of memory installed or the performance of processor installed, and is able to detect red-eye from the expanded picture image. FIG. 10B is a view that shows a state where a 16 line image stored in the original image shown in FIG. 10A is expanded into a picture image. FIG. 10C is a view that shows a state where a 32 line image is expanded into a picture image.

When red-eye has been detected by the red-eye detection unit 216, the red-eye area storage processing unit 217 stores the position of the red-eye in the red-eye table $TBL_{RE}$. As shown in FIG. 11, the number of the red-eye, the center of the red-eye center, the diameter of the red-eye, and the like, are recorded in the red-eye table $TBL_{RE}$.

When the RGB image data calling unit 214 calls the RGB image data $LD_{RGB}$ for the second time, the red-eye correction unit 218 detects whether the red-eye area stored in the red-eye table $TBL_{RE}$ is included in the image of the called RGB image data $LD_{RGB}$ and executes red-eye correction on the RGB image data. The red-eye correction is executed by replacing a pixel color in the red-eye area by black color, or the like. In FIG. 8, the corrected RGB image data is denoted by $LD_{RGB}'$.

When the RGB image data calling unit 214 is called for the first time, the print data creating unit 219, among the called RGB image data $LD_{RGB}$, (1) for RGB image data on which no red-eye correction has been executed by the red-eye correction unit 218, creates print data PD from the RGB image data $LD_{RGB}$ and (2) for RGB image data $LD_{RGB}'$ on which red-eye correction has been executed by the red-eye correction unit 218, creates print data PD from the RGB image data $LD_{RGB}'$, and then transfers these print data PD to the printing mechanism 2120.

Figure 9:
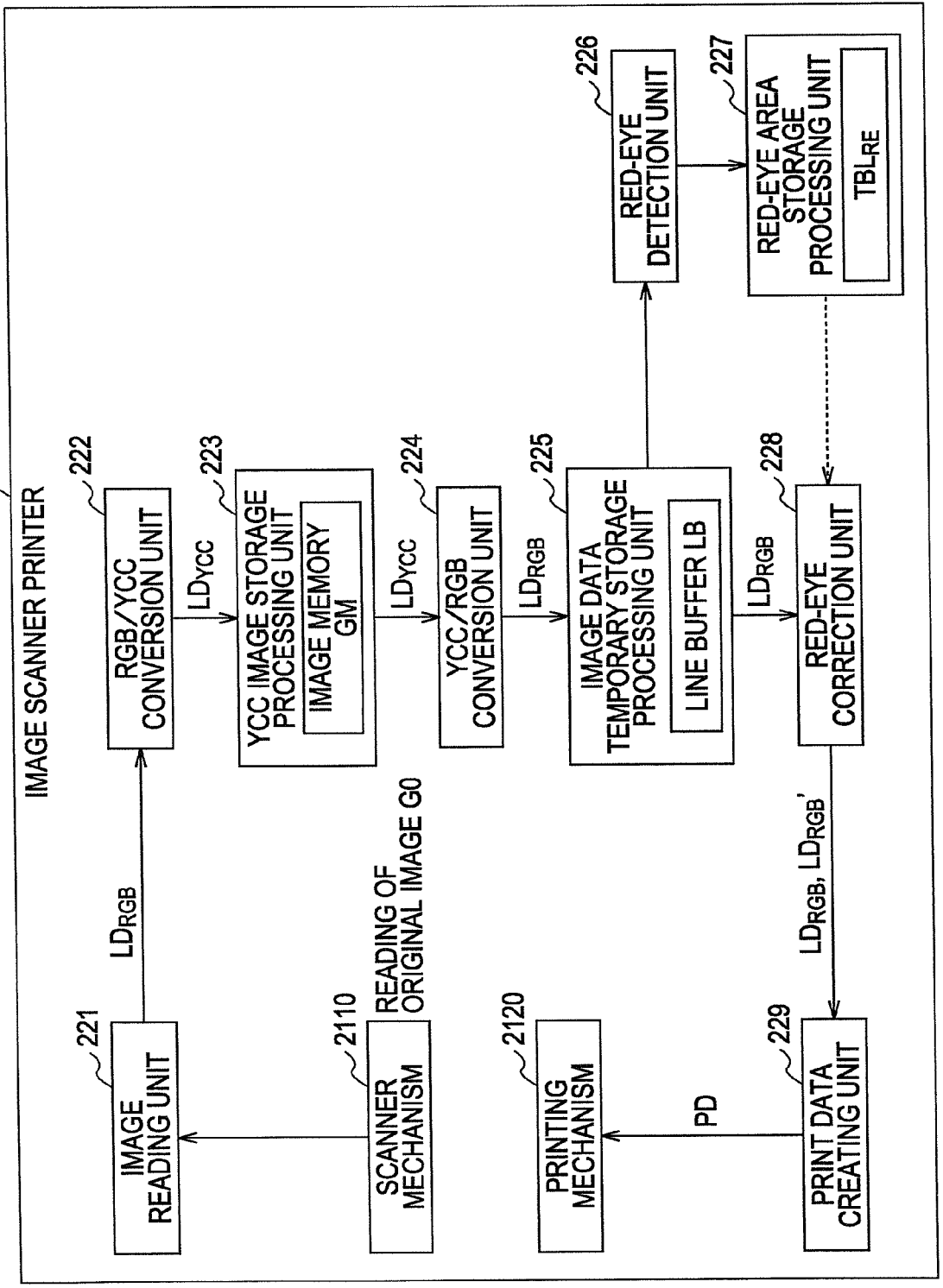
FIG. 9 is a block diagram illustrating another exemplary embodiment of an image scanner printer according to the invention.

FIG. 9 is a block diagram illustrating another exemplary embodiment of an image scanner printer according to the invention. As shown in FIG. 9, the image scanner printer 22 is provided with a scanner mechanism 2210 that reads an original image G0 and a printing mechanism 2220 that performs printing. The image scanner printer 22 includes an image reading unit 221, an RGB/YCC conversion unit 222, a YCC image storage unit 223, a YCC/RGB conversion unit 224, an image data temporary storage unit 225, a red-eye detection unit 226, a red-eye area storage processing unit 227, a red-eye correction unit 228, and a print data creating unit 229.

The image reading unit 221, which is the same as the image reading unit 211 of FIG. 8, drives the scanner mechanism 2210. The scanner mechanism 2210 reads the original image G0. The image reading unit 221 acquires RGB image data $LD_{RGB}$ from the scanner mechanism 2210. When the image reading unit 221 executes reading, the RGB/YCC conversion unit 222 converts a predetermined number of lines of the RGB image data into a YCC image. For example, the YCC image data $LD_{YCC}$ are created in units of 8 lines by executing DCT conversion, quantization, and Huffman coding on the RGB image data $LD_{RGB}$. The YCC image storage unit 223 sequentially accumulates the RGB image data $LD_{RGB}$ that have been converted by the RGB/YCC conversion unit 222 and stores the data in an image storage device (image memory GM in the present exemplary embodiment) as a JPEG image.

The YCC/RGB conversion unit 224 executes an operation twice in total in which the YCC image $LD_{YCC}$ is called in units of a line or in units of a predetermined number of lines or in units of processes on the JPEG image $G_{JPG}$ stored in the image memory GM and converted into the RGB image data $LD_{RGB}$.

The image data temporary storage unit 225 stores a predetermined number of lines of the RGB image data $LD_{RGB}$ in a line data storage device in the first operation of the YCC/RGB conversion unit 224. The red-eye detection unit 226 detects red-eye that is included in an image corresponding to the RGB image data $LD_{RGB}$ that are stored in the line buffer LB.

In red-eye detection, an object included in the expanded picture image is extracted, and the extracted object is then compared with a shape pattern of red-eye, a shape pattern of a peripheral portion of red-eye, or a face pattern, which is stored in a storage device (ROM) (not shown). The red-eye detection unit 226 is able to expand an image of an appropriate number of lines, such as 16 lines, 32 lines, or the like, into a picture image in accordance with the amount of memory installed or the performance of processor installed, and is able to detect red-eye from the expanded picture image. In the present exemplary embodiment as well, the number of lines by which a picture image is expanded may be appropriately determined. For example, a 16 line image may be expanded into a picture image as shown in FIG. 10B, or a 32 line image may be expanded into a picture image as shown in FIG. 10C.

When red-eye has been detected by the red-eye detection unit 226, the red-eye area storage processing unit 227 stores the position of the red-eye in the red-eye table $TBL_{RE}$. In this case, the number of the red-eye, the center of the red-eye, the diameter of the red-eye, and the like, are recorded in the red-eye table $TBL_{RE}$, as shown in FIG. 11.

When the YCC/RGB conversion unit 224 is operated for the second time, the red-eye correction unit 228 detects whether the red-eye area stored in the red-eye table $TBL_{RE}$ is included in an image corresponding to the called RGB image data $LD_{RGB}$ and executes red-eye correction on the RGB image data. The red-eye correction is executed by replacing a pixel color in the red-eye area by black color, or the like. In FIG. 9, the corrected RGB image data is denoted by $LD_{RGB}'$.

When the YCC/RGB conversion unit 224 is operated for the first time, the print data creating unit 229, among the called RGB image data $LD_{RGB}$, (1) for RGB image data on which no red-eye correction has been executed by the red-eye correction unit 228, creates print data PD from the RGB image data $LD_{RGB}$ and (2) for RGB image data $LD_{RGB}'$ on which the red-eye correction has been executed by the red-eye correction unit 228, creates print data PD from the RGB image data $LD_{RGB}'$. Then, the print data creating unit 229 transfers these print data PD to the printing mechanism 2120.

Figure 12:
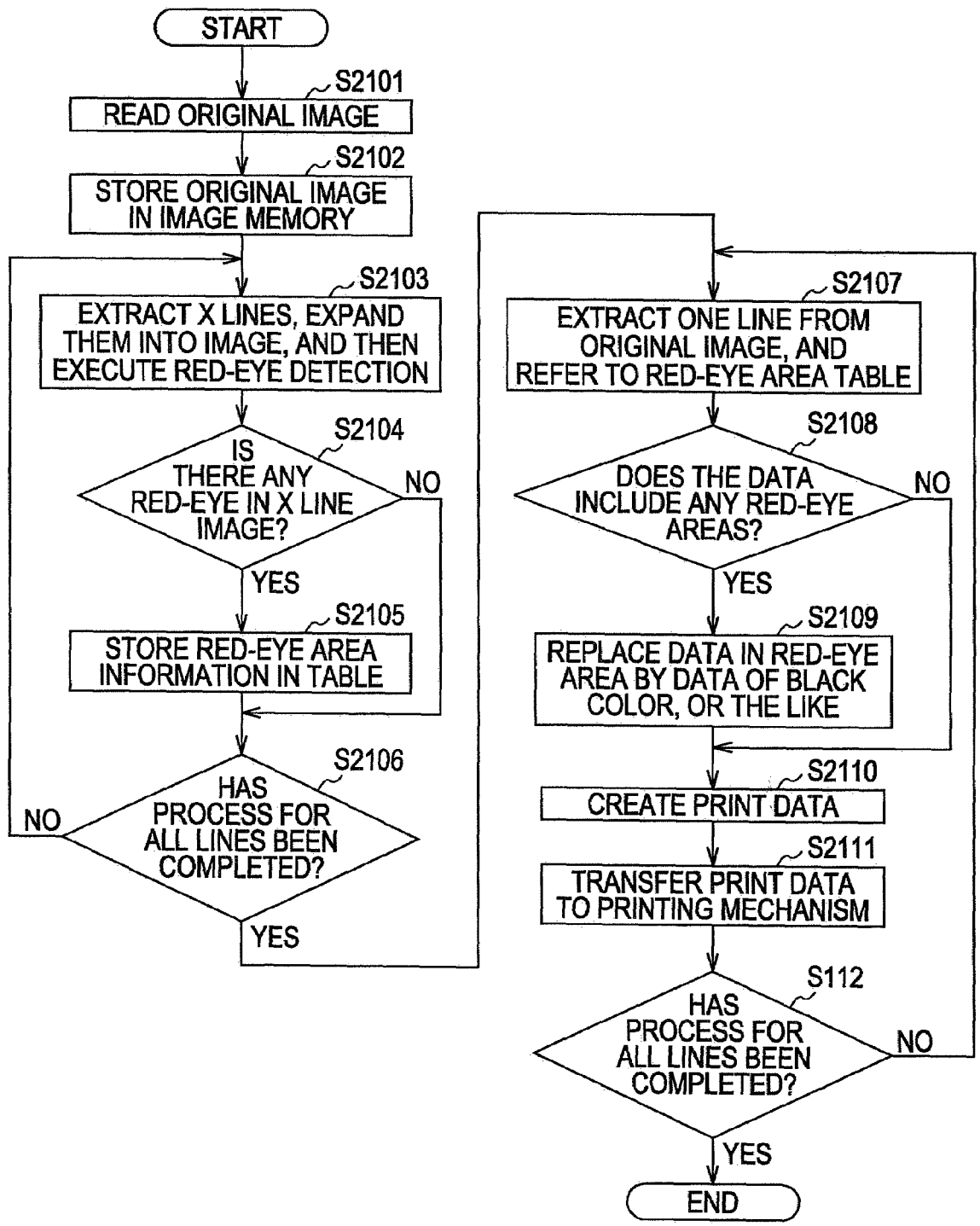
FIG. 12 is a flowchart that shows the operation of the image scanner printer of FIG. 8.

The operation of the image scanner printer 21 will now be described in detail with reference to the flowchart of FIG. 12. In FIG. 12, the image reading unit 211 instructs the scanner mechanism 2110 to read the original image G0. Then, the scanner mechanism 2110 performs reading of the original image G0 (S2101). When the scanner mechanism 2110 completes reading of the original image G0, the read data are stored in the image memory GM (S2102).

Subsequently, red-eye detection is executed by expanding an X line original image G0 from the image memory GM into a picture image in a predetermined memory (word area) (S2103). When red-eye has been detected in the X line image ("YES" in S2104), red-eye area information is stored in the table $TBL_{RE}$ (S2105). When red-eye information has been stored in the table $TBL_{RE}$, or when no red-eye is included in the X line image in S2104 ("NO" in S2104), it is determined whether the processes in S2103 to S2105 have been completed for all the lines of the original image G0. When the processes are not completed ("NO" in S2106), the process returns to S2103. When the processes have been completed ("YES" in S2106), one line is extracted from the original image G0 and, on data in the one line, the presence or absence of red-eye and a red-eye area are detected by referring to the red-eye table $TBL_{RE}$ (S2107).

When the data in the one line includes a red-eye area ("YES" in S2108), the data of the red-eye area are replaced by data of black color, or the like (S2109). When the data in the one line have been replaced by the data of black color, or the like, in S2109, or when no red-eye area is included in the called line ("NO" in S2108), print data PD are created (S2110) and then transferred to the printing mechanism 2120 (S2111).

Figure 13:
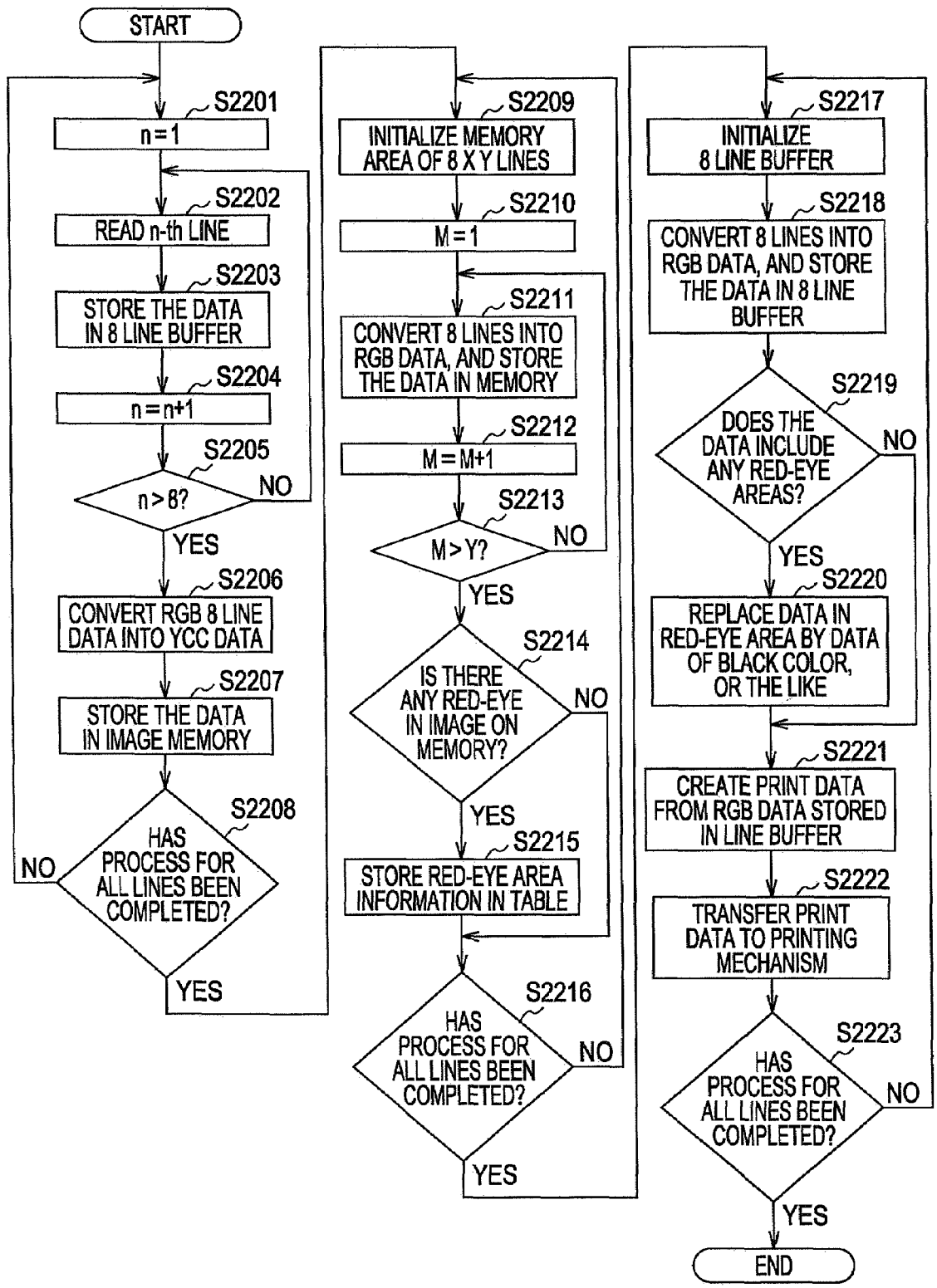
FIG. 13 is a flowchart that shows the operation of the image scanner printer of FIG. 9.

The operation of the image scanner printer 22 will now be described in detail with reference to the flowchart of FIG. 13. In FIG. 13, the image reading unit 221 instructs the scanner mechanism 2110 to read the original image G0. When the scanner mechanism 2210 initiates to read, the reading line pointer is set to n=1 (S2201).

Figure 14:
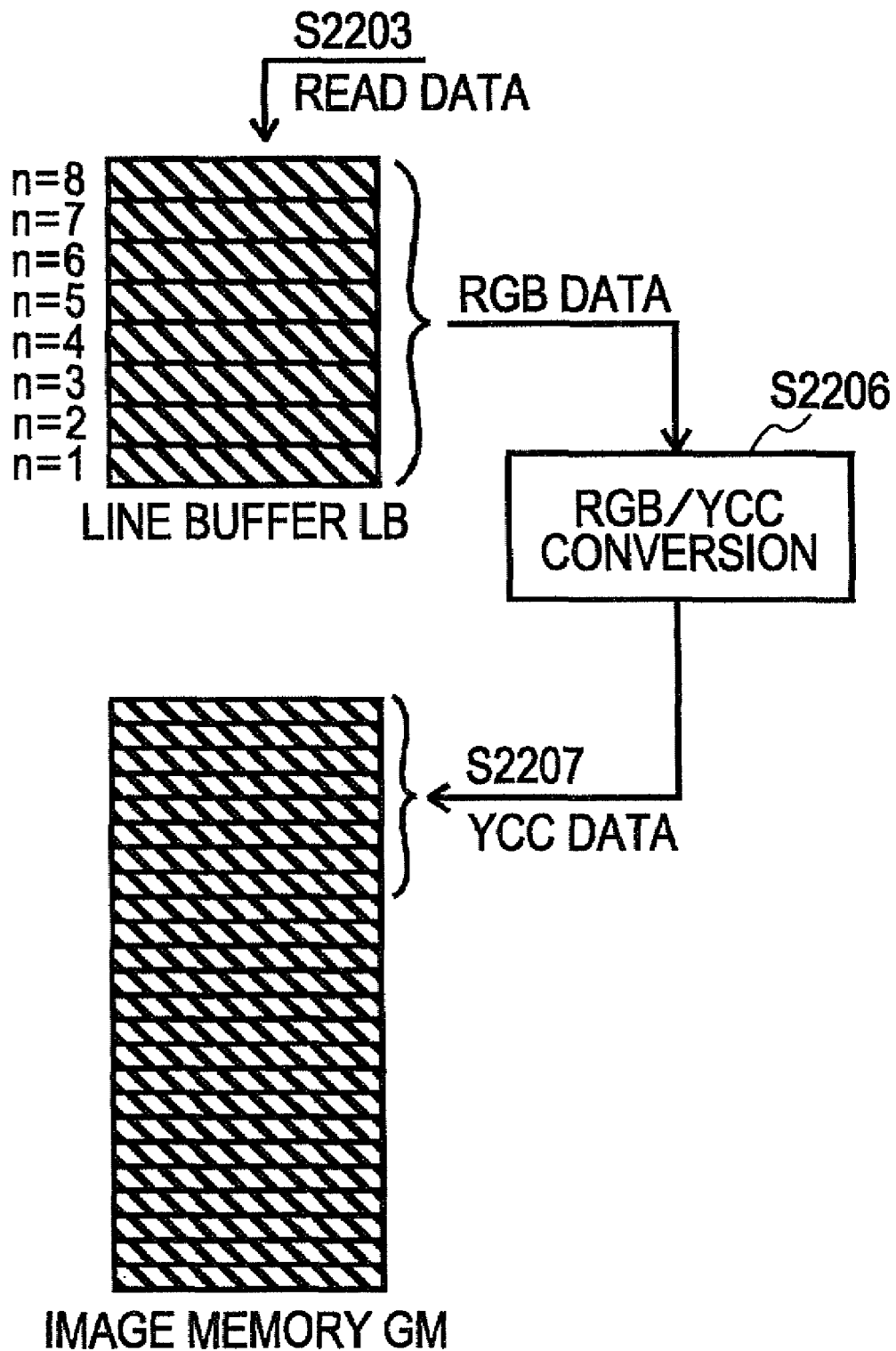
FIG. 14 is a view that supplements processes executed in S2203, S2206 and S2207 of the flowchart of FIG. 13.

Then, the RGB image data are stored in the line buffer LB line by line (S2202, S2203), n is sequentially incremented (S2204), and 8 line RGB image data are stored in the line buffer LB ("NO" in S2205). These RGB image data $LD_{RGB}$ are converted into a YCC image $LD_{YCC}$ (S2206) and then stored in the image memory GM. FIG. 14 is a view that shows a state where the RGB image data $LD_{RGB}$ stored in the line buffer LB are converted into the YCC image $LD_{YCC}$ and stored in the image memory GM.

Figure 15:
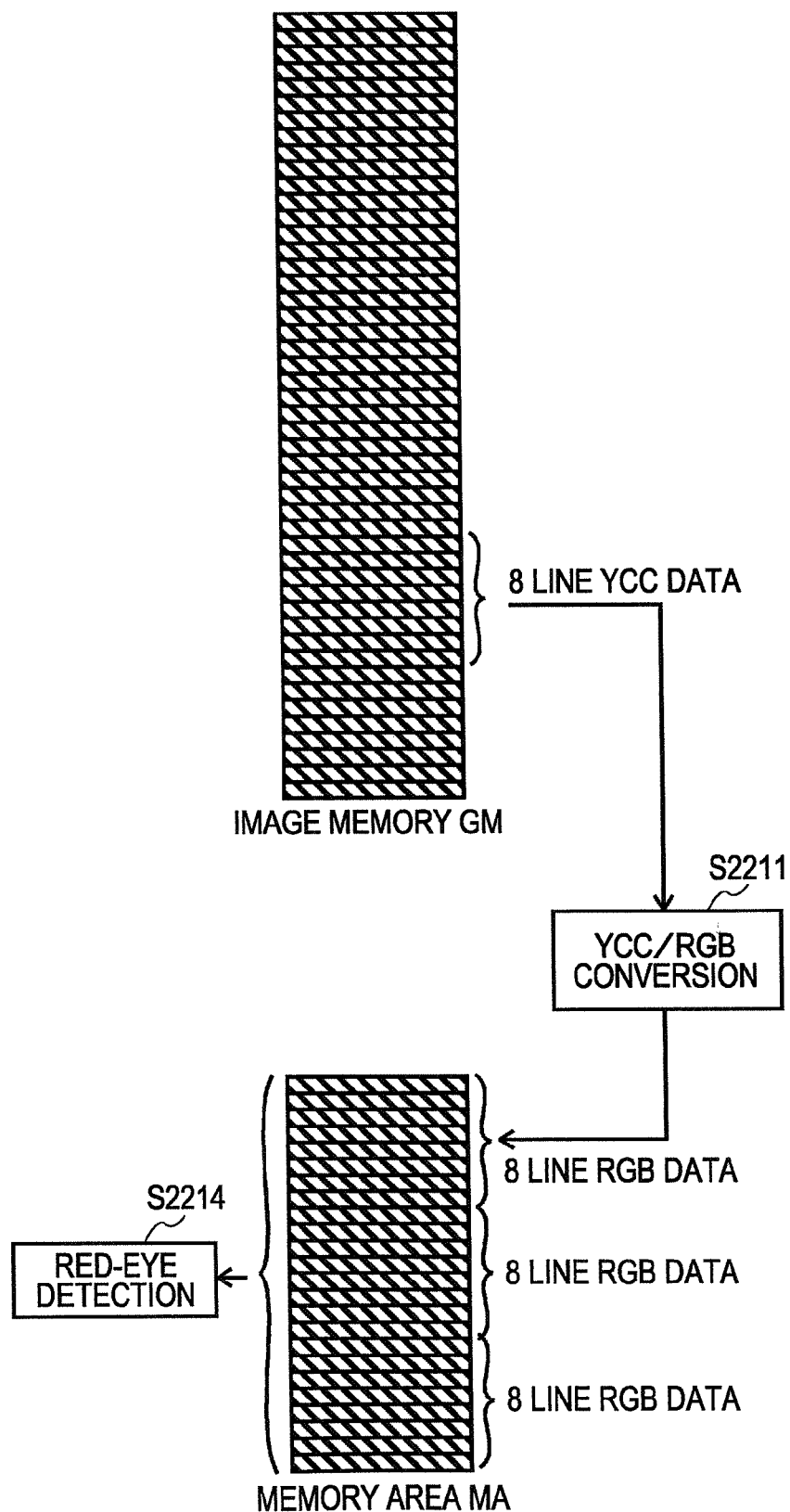
FIG. 15 is a view that supplementarily illustrates processes executed in S2211 and S2214 of the flowchart of FIG. 13.

The processes in S2201 to S2207 (RGB/YCC conversion) are executed for all the lines of the original image G0 ("NO" in S2208). When the RGB/YCC conversion for all the lines has been completed ("YES" in S2208), and when a JPEG image $G_{JPG}$ is stored in the image memory GM as one unit image, a predetermined 8×Y lines memory area MA is initialized (S2209), and a pointer M that shifts in units of 8×Y lines is set to 1 (M=1) (S2210). Subsequently, the 8 line YCC image $LD_{YCC}$ in the JPEG image $G_{JPG}$ is converted into the RGB image data $LD_{RGB}$ and stored in the memory area MA (S2211). Then, M is incremented (M=M+1) (S2212), and the process in S2211 is repeatedly executed until M=Y (S2213). FIG. 15 is a view that shows a state where, when Y=3, the 8×Y line RGB image data $LD_{RGB}$ are stored in the memory area MA.

Then, it is detected whether the image in the memory area MA includes red-eye (S2214). When red-eye is included ("YES" in S2214), red-eye area information is stored in the table $TBL_{RE}$ (S2215). When the red-eye area information has been stored in the table $TBL_{RE}$, or when it has been determined that no red-eye is included in S2214 ("NO" in S2214), it is determined whether the processes S2209 to S2215 have been executed for all the lines in the JPEG image $G_{JPG}$ (S2216). When the above processes are not performed for all the lines in the JPEG image $G_{JPG}$ ("NO" in S2216), the process returns to S2209.

Figure 16B:
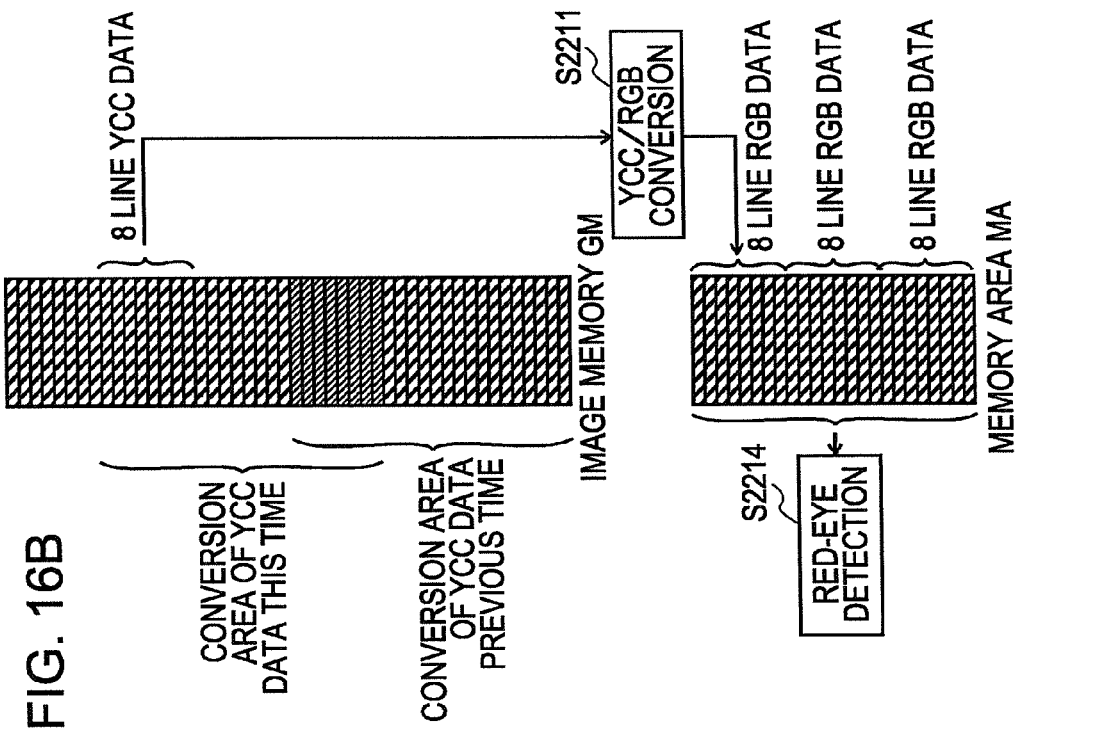
FIG. 16B is a view that illustrates another example of a process for executing red-eye detection with high precision.
Figure 16A:
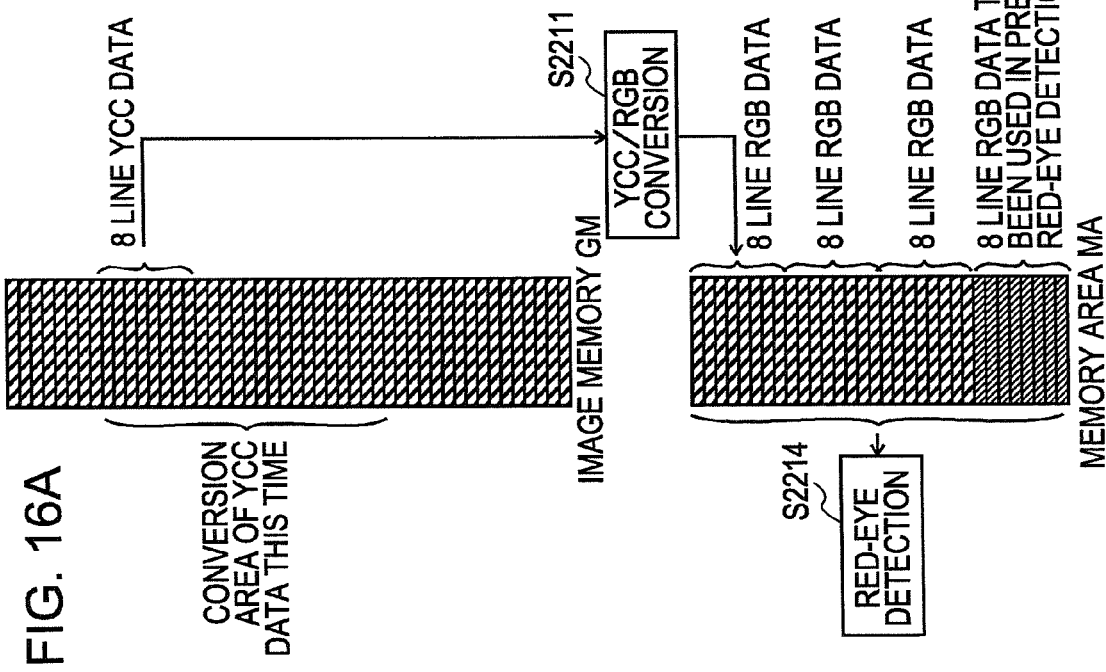
FIG. 16A is a view that illustrates an example of a process for executing red-eye detection with high precision.

In the above example, red-eye detection is executed on the 8×Y line RGB image data $LD_{RGB}$; however, as shown in FIG. 16A, the last 8 line data among the RGB image data $LD_{RGB}$ used in the previous red-eye detection (S2214) may be left at the top line in the memory area MA (the lowermost line of the memory shown in the drawing. In this case, red-eye detection is executed on the last 8 line data and the above described 8×Y line (Y=3 in FIG. 16A) RGB image data $LD_{RGB}$. In addition, as shown in FIG. 16B, when the 8×Y line (Y=3 in FIG. 16B) YCC image $LD_{YCC}$ is converted into the RGB image data $LD_{RGB}$, the last 8 lines of the YCC image $LD_{YCC}$ that have been previously converted (the previous time S2211) may be used as the initial 8 lines of the YCC image $LD_{YCC}$ that will be converted this time (this time S2211). In the manner shown in FIG. 16A and FIG. 16B, it is possible to accurately detect red-eye when the red-eye is present at the boundary between the adjacent groups of 8 lines.

Figure 17:
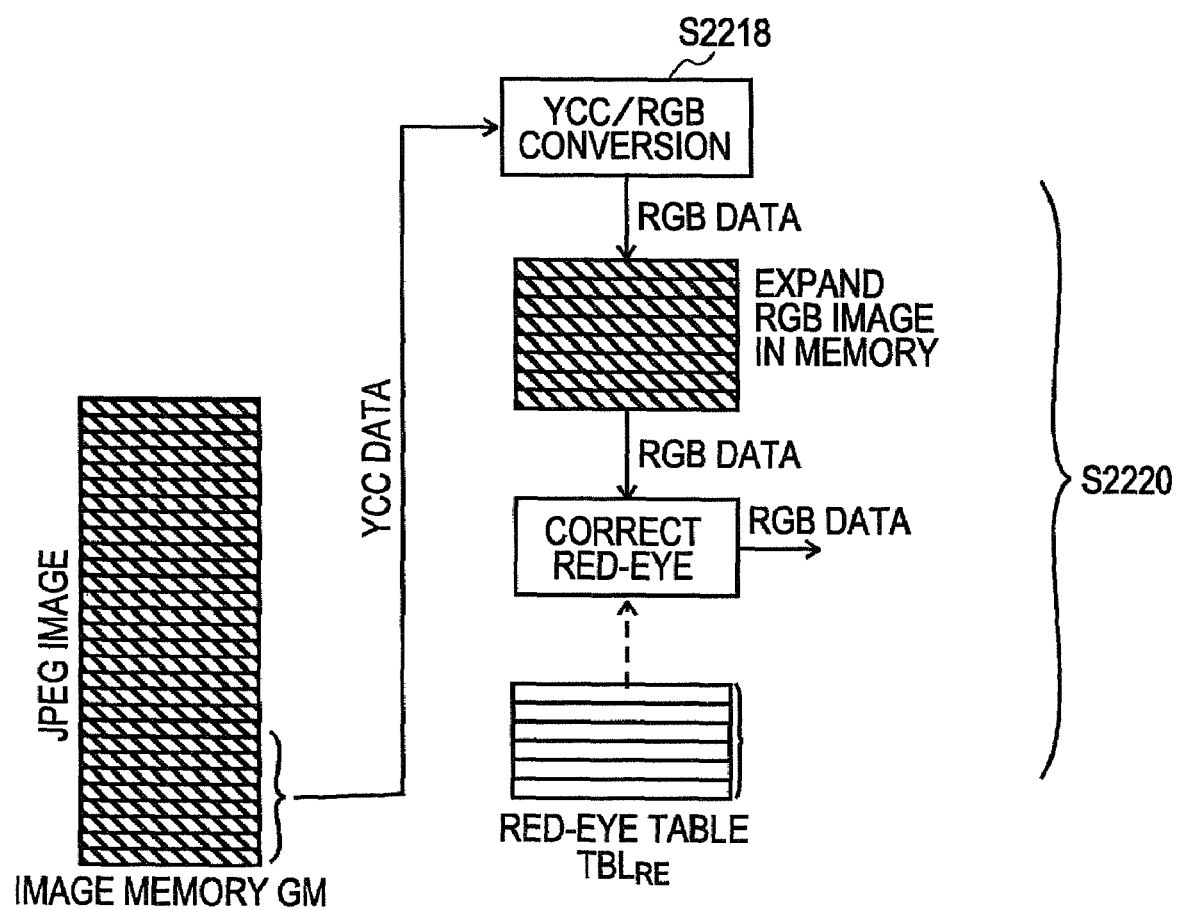
FIG. 17 is a view that supplementarily illustrates processes executed in S2219, S2220 of the flowchart of red-eye correction.

When the processes in S2209 to S2214 are executed for all the lines in the JPEG image $G_{JPG}$, the line buffer that stores 8 lines is initialized (S2217), 8 line YCC image $LD_{YCC}$ is extracted from the image memory GM and converted into the RGB image data $LD_{RGB}$ and then stored in the line buffer LB (S2218). When an image corresponding to the RGB image data $LD_{RGB}$ stored in the 8 line buffer includes a red-eye area stored in the red-eye table $TBL_{RE}$ ("YES" in S2219), the RGB image data $LD_{RGB}$ are replaced by data of black color, or the like (S2220). FIG. 17 is a view that shows a state where the YCC image $LD_{YCC}$ of the JPEG image $G_{JPG}$, which is stored in the image memory GM, is called line by line in S2218 and red-eye correction is executed on the RGB image data $LD_{RGB}$ in S2220.

Then, among the RGB image data $LD_{RGB}$, the print data creating unit 229 (1) for RGB image data $LD_{RGB}$ on which no red-eye correction has been executed by the red-eye correction unit 228 ("NO" in S2219), creates print data from the RGB image data $LD_{RGB}$ and (2) for RGB image data $LD_{RGB}'$ on which the red-eye correction has been executed by the red-eye correction unit 228 (S2220), creates print data PD from the RGB image data $LD_{RGB}'$ (S2221), and then transfers these print data PD to the printing mechanism 2120 (S2222).

FIG. 10D is a view that shows the printed image G0 on which red-eye correction has been executed. The processes in S2217 to S2222 are repeatedly executed for all the lines in the JPEG image $G_{JPG}$ that is stored in the image memory GM ("NO" in S2223). When the processes for all the lines have been completed ("YES" in S2223), all processes are completed.

According to the first aspect of the invention, after the original image is read and the image data are stored in the memory, data calling is executed twice from the memory. In the first calling, red-eye detection is executed and stored in the red-eye area table. In the second calling, red-eye correction is executed. Thus, it is possible to reduce the number of driving of the scanner, and it is possible to execute red-eye correction without any positional deviation. The aspects of the invention are also effective when applied to a stand-alone printer to which a computer is not always connected.

Second Aspect

Figure 18:
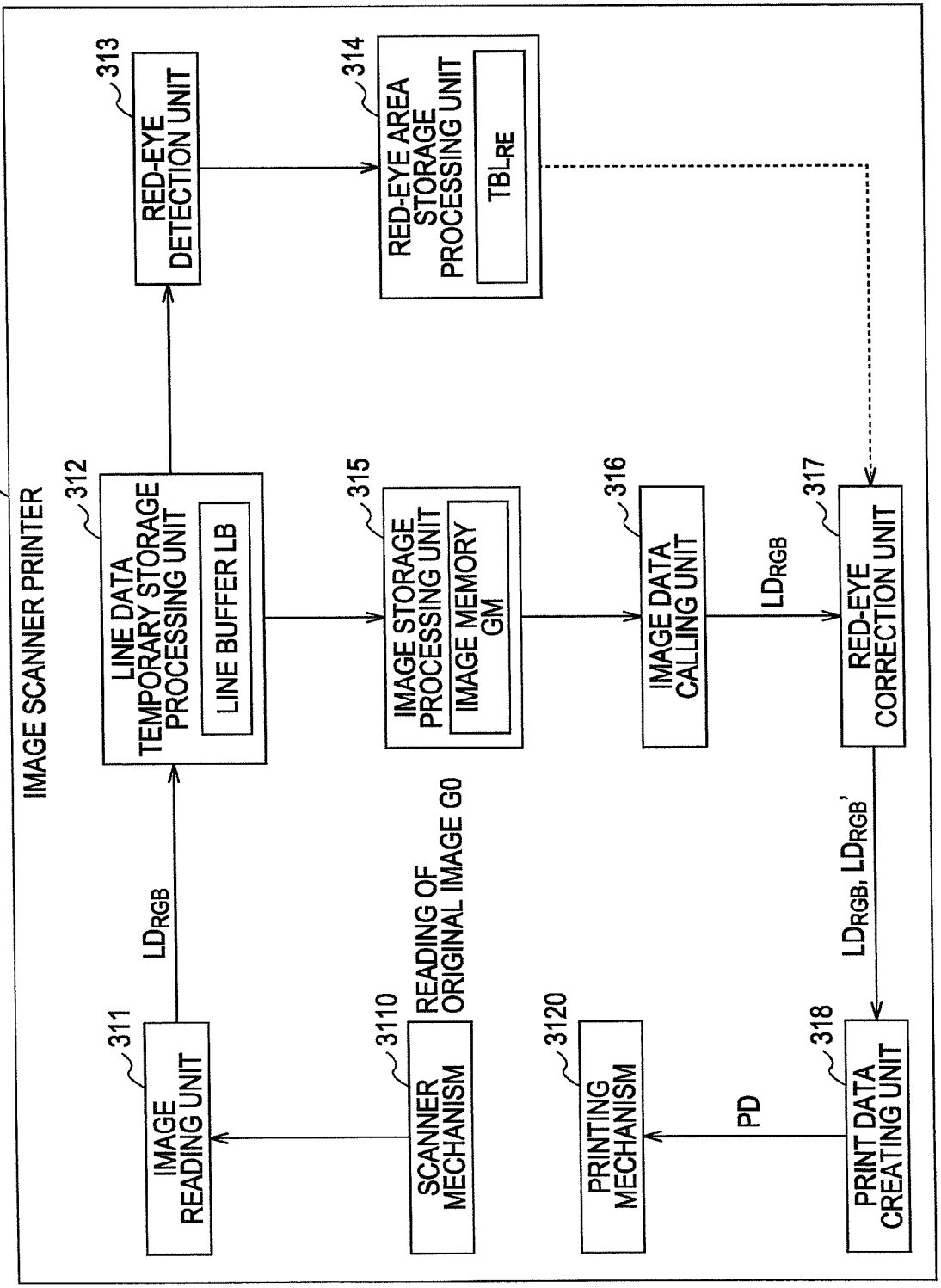
FIG. 18 is a block diagram illustrating one exemplary embodiment of an image scanner printer according to a second aspect of the invention.

FIG. 18 is a block diagram illustrating one exemplary embodiment of an image scanner printer according to the invention. As shown in FIG. 18, the image scanner printer 31 is provided with a scanner mechanism 3110 that reads an original image G0 and a printing mechanism 3120 that performs printing. The image scanner printer 31 includes an image reading unit 311, a line data temporary storage processing unit 312, a red-eye detection unit 313, a red-eye area storage processing unit 314, an image storage processing unit 315, an image data calling unit 316, a red-eye correction unit 317, and a print data creating unit 318.

Figure 19A:
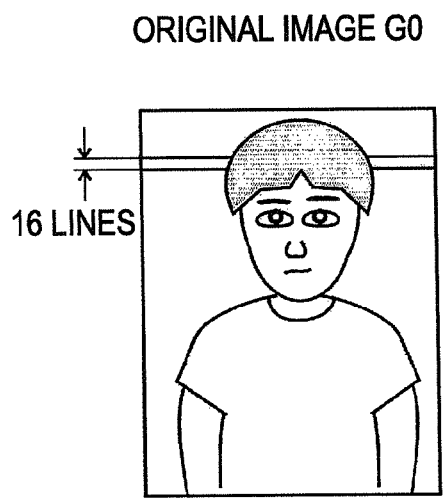
FIG. 19A is a view that shows 16 lines on an original image.

The image reading unit 311 drives the scanner mechanism 3110 and acquires RGB image data $LD_{RGB}$ of the original image G0, which are read by the scanner mechanism 3110. When the scanner mechanism 310 reads an image, the line data temporary storage processing unit 312 stores a predetermined number of lines (8 lines or 16 lines in the present exemplary embodiment) of the RGB image data, which are transmitted from the image reading unit 311, in a data line storage device (a line buffer LB in the present exemplary embodiment). FIG. 19A is a view that shows 16 lines on the original image G0. The line buffer LB may have a configuration shown in FIG. 20A. In this case, line data are stored in units of 16 lines.

Figure 20A:
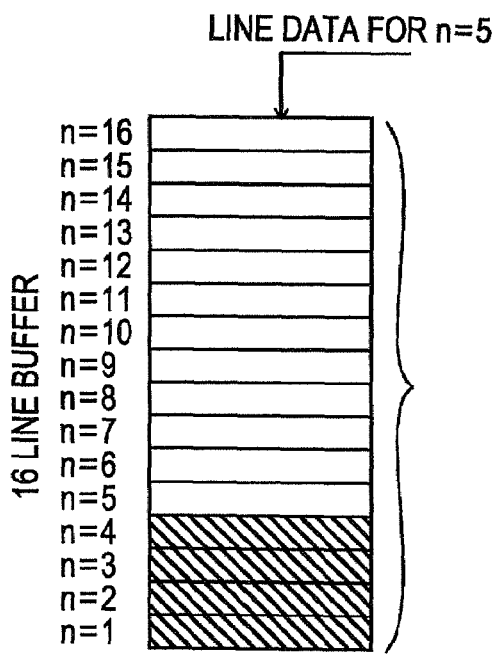
FIG. 20A is a view of a line buffer in which line data are stored in units of 16 lines.
Figure 20B:
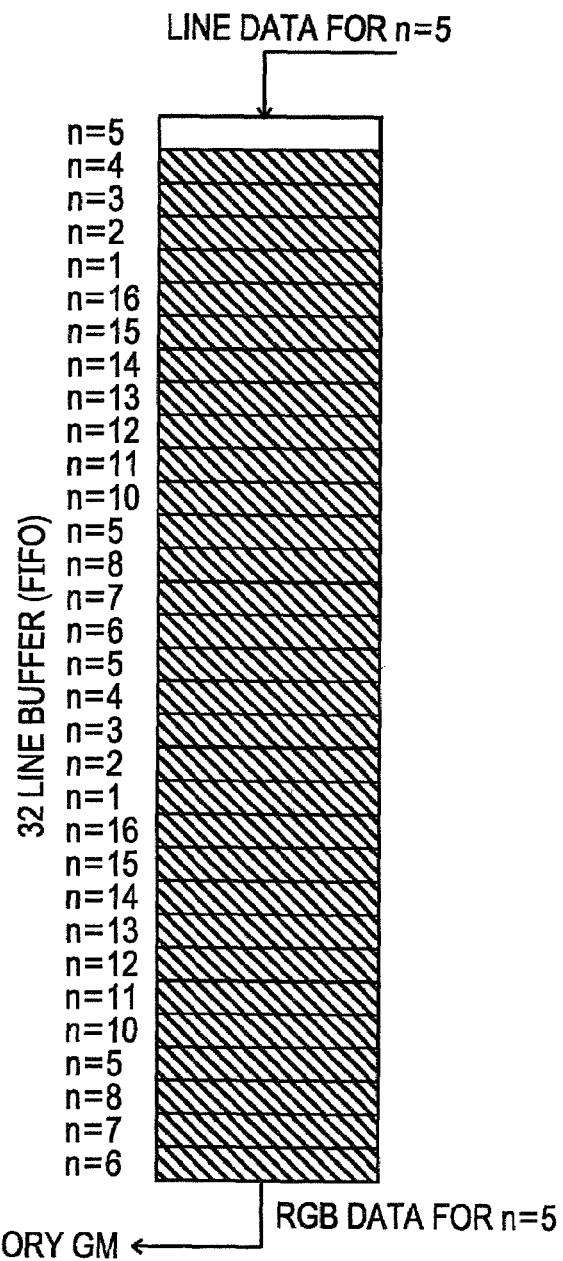
FIG. 20B is a view of a FIFO line buffer that stores 32 line data.

In addition, the line buffer LB may have a FIFO configuration as shown in FIG. 20B. In this case, a read line will be stored line by line into the line buffer LB by pushing the lines stored in the line buffer LB. In FIG. 20B, the line buffer LB is formed of 32 lines. The pointer of the line buffer LB is reset every 16 lines in order to execute red-eye detection in units of 16 lines (see S301, S305 of the flowchart of FIG. 22, which will be described later). Note that FIG. 20A and FIG. 20B are views that show a state where a fifth line (n=5) is being stored in the line buffer LB.

Figure 19B:
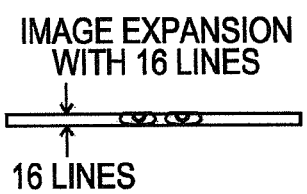
FIG. 19B is a view that shows a state where a 16 line image is expanded into a picture image.
Figure 19C:
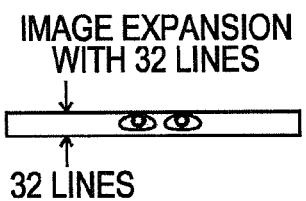
FIG. 19C is a view that shows a state where a 16 line image is expanded into a picture image.

The red-eye detection unit 313 detects red-eye that is included in an image corresponding to the RGB image data $LD_{RGB}$ stored in the line buffer LB. When the line buffer LB has a configuration as shown in FIG. 20A, the red-eye detection unit 313 expands a 16 line image into a picture image. When the line buffer LB has a configuration as shown in FIG. 20B, the red-eye detection unit 313 expands a 32 line image into a picture image and executes known red-eye detection. FIG. 19B is a view that shows a state where a 16 line image is expanded into a picture image. FIG. 19C is a view that shows a state where a 32 line image is expanded into a picture image.

In red-eye detection, an object included in the expanded picture image is extracted, and the extracted object is then compared with a shape pattern of red-eye, a shape pattern of a peripheral portion of red-eye, or a face pattern, which is stored in a storage device (ROM) (not shown). When the line buffer LB has a configuration as shown in FIG. 20B, it is possible to accurately perform red-eye detection even when the eyes of a human extends over the adjacent groups of processing unit 16 lines.

When red-eye is detected by the red-eye detection unit 313, the red-eye area storage processing unit 314 stores the position of the red-eye in the red-eye area table $TBL_{RE}$. As shown in FIG. 21, the number of the red-eye, the center of the red-eye, the diameter of the red-eye, and the like, are recorded in the red-eye area table $TBL_{RE}$.

The image storage processing unit 315 writes the RGB image data $LD_{RGB}$ stored in the line buffer LB in an image storage device (image memory GM in the present exemplary embodiment) and stores the data as one unit image (here, RGB image $G_{RGB}$). When the line buffer LB has a configuration shown in FIG. 20A, 16 line RGB image data $LD_{RGB}$ are transferred to the image storage processing unit 315 before writing of the next 16 lines is initiated. When the line buffer LB has a FIFO configuration shown in FIG. 20B, the 32 line preceding RGB image data $LD_{RGB}$ are pushed by newly read RGB image data $LD_{RGB}$ and sequentially transferred to the image memory GM. Note that, although there are no newly read RGB image data $LD_{RGB}$, the last 32 lines of the original image G0 are sequentially transferred to the image memory.

The image data calling unit 316 calls the RGB image data $LD_{RGB}$ line by line on the image $G_{RGB}$ that is stored in the image memory GM. When the image of the RGB image data $LD_{RGB}$, called by the image data calling unit 316, includes a red eye region that has been stored in the red-eye area table $TBL_{RE}$, the red-eye correction unit 317 replaces a pixel color in the red-eye area by black color, or the like, on the RGB image data $LD_{RGB}$. Here, the corrected RGB image data are denoted by $LD_{RGB}'$.

Among the RGB image data $LD_{RGB}$ called by the image data calling unit 316, the print data creating unit 318 (1) for RGB image data on which no red-eye correction has been executed by the red-eye correction unit 317, creates print data PD from the RGB image data $LD_{RGB}$ and (2) for RGB image data $LD_{RGB}'$ on which red-eye correction has been executed by the red-eye correction unit 317, creates print data PD from the RGB image data $LD_{RGB}'$, and then transfers these print data PD to the printing mechanism 3120.

Figure 22:
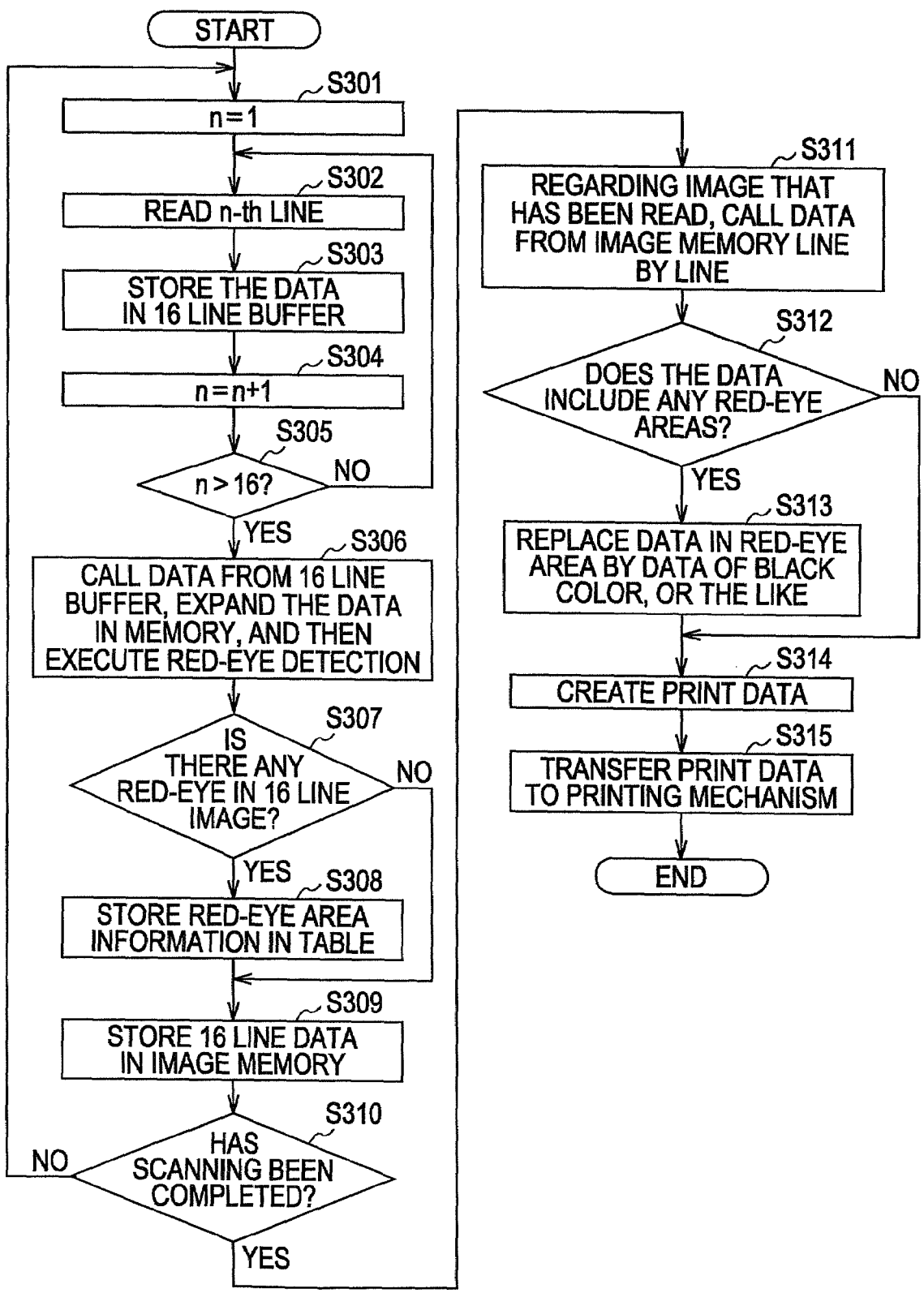
FIG. 22 is a flowchart that shows the operation of the image scanner printer.

The operation of the image scanner printer 31 will now be described in detail with reference to the flowchart of FIG. 22. In FIG. 22, the image reading unit 311 ensures an area in a line data storage device (16-line line buffer LB in the present exemplary embodiment), a pointer is set to n=1 (S301).

Figure 23A:
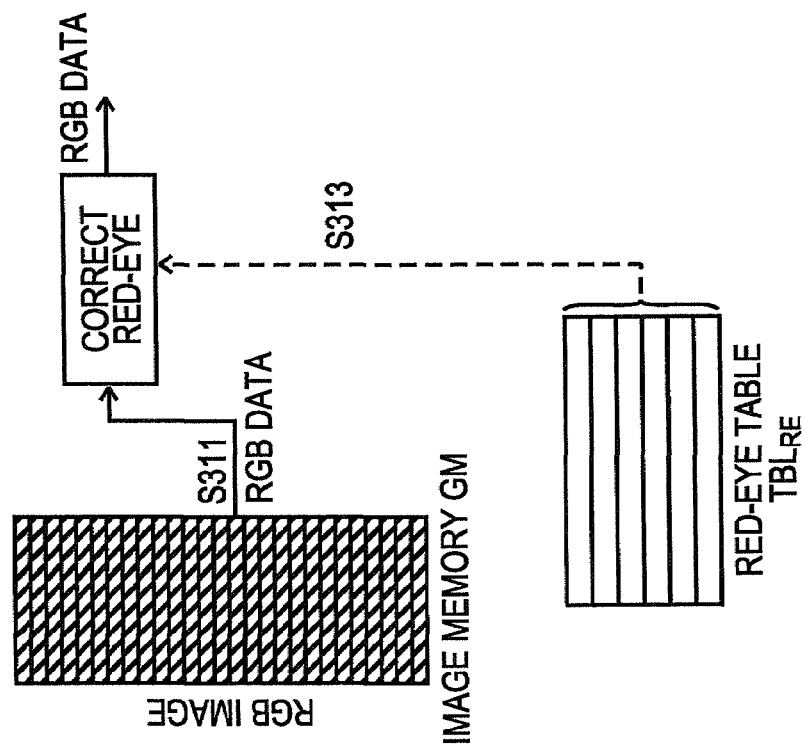
FIG. 23A to FIG. 23C are views that supplement the flowchart of FIG. 22.

The original image G0 is read line by line by the scanner mechanism 3110 (S302). When the RGB image data $LD_{RGB}$ of each line are stored in the line buffer LB by the line data temporary storage processing unit 312 (S303), n is incremented (n=n+1) (S304). FIG. 23A is a view that shows a state where, in S303, the RGB image data $LD_{RGB}$ at n=15 are being stored in the line buffer LB.

The processes in S302 to S304 for each line are repeatedly executed until n=16 ("NO" in S305). When reading of 16 lines has been completed ("YES" in S305), 16 line RGB image data $LD_{RGB}$ are called from the line buffer LB to a predetermined memory space and expanded into a picture image (see FIG. 22B), and then red-eye that is included in this expanded picture image is detected by the red-eye detection unit 313 (S306).

When red-eye has been detected in S306 ("YES" in S307), the red-eye area storage processing unit 314 stores the position of the red-eye in the red-eye area table $TBL_{RE}$ (S308).

Figure 23B:
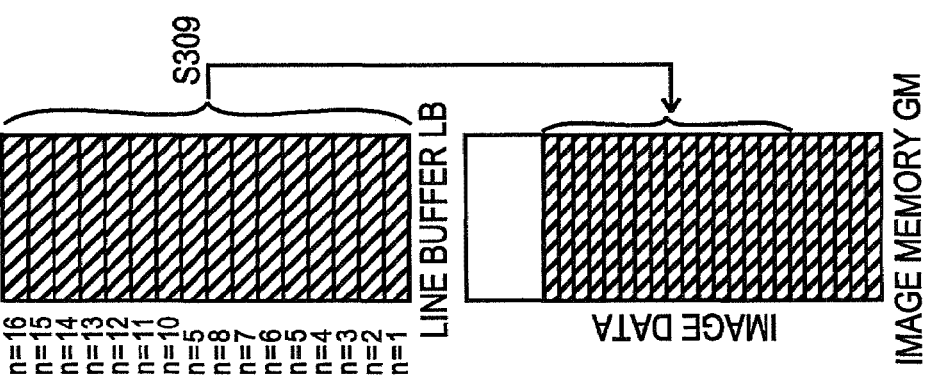

When no red-eye has been detected in S306 ("NO" in S307), or when the position of red-eye has been stored in the red-eye table $TBL_{RE}$ in S308 in the case where the red-eye has been detected, the 16 line RGB image data $LD_{RGB}$ stored in the line buffer LB are stored in the image memory GM by the image storage processing unit 315 (S309). FIG. 23B is a view that shows a state where, in S309, 16 line RGB image data $LD_{RGB}$ are stored in the image memory GM.

Until the scanning is completed, the processes in S301 to S309 are repeatedly executed ("NO" in S310). Upon completion of the scanning, one unit image (here, RGB image $G_{RGB}$) is stored in the image memory GM. When the scanning is completed ("YES" in S310), the RGB image data $LD_{RGB}$ of the RGB image $G_{RGB}$ stored in the image memory GM are called by the image data calling unit 316 line by line (S311).

When an image corresponding to the RGB image data $LD_{RGB}$ called by the image data calling unit 316 includes a red-eye area stored in the red-eye area table $TBL_{RE}$ ("YES" in S312), the red-eye correction unit 317 replaces the RGB image data $LD_{RGB}$ by data of black color, or the like (S313).

Figure 23C:
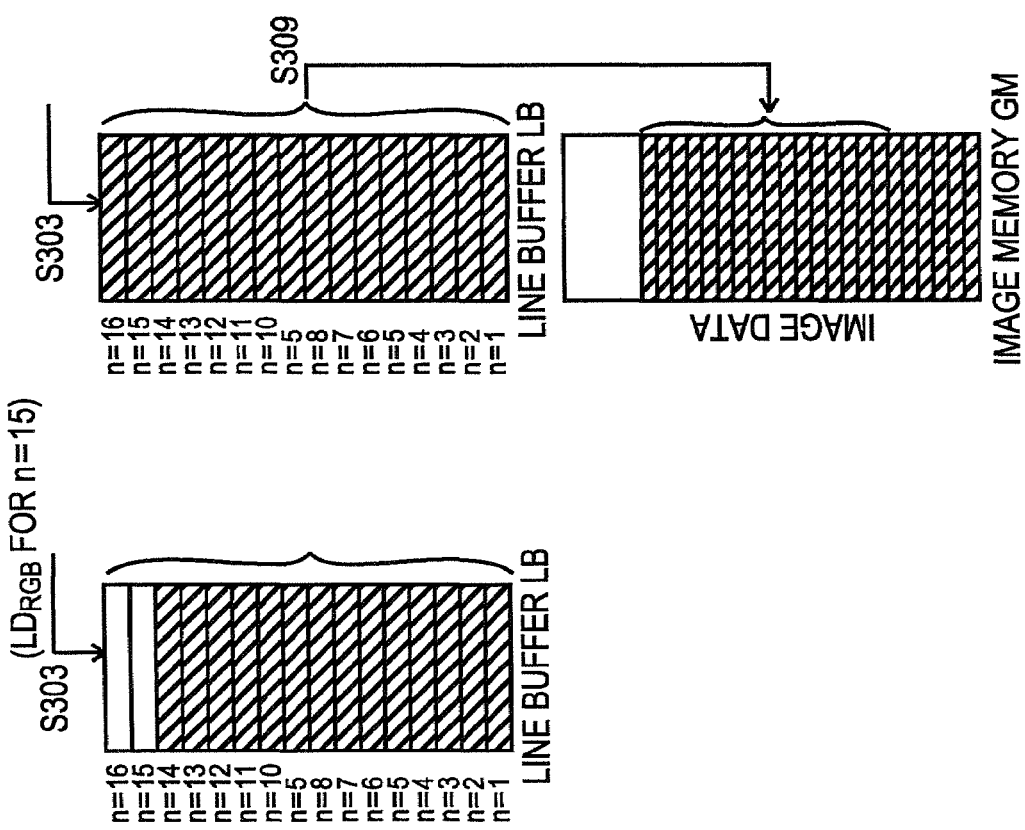

FIG. 23C is a view that shows a state where the RGB image data $LD_{RGB}$ of the RGB image $G_{RGB}$, which are stored in the image memory GM, are called line by line in S311 and red-eye correction is executed in S313 on the RGB image data $LD_{RGB}$.

Figure 19D:
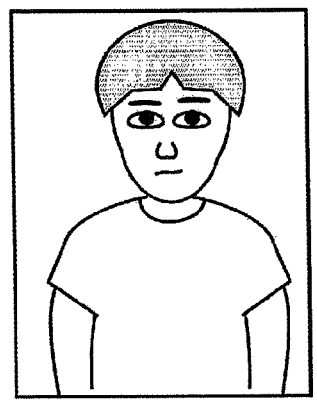
FIG. 19D is a view that shows a printed image on which red-eye correction is executed.

Then, among the RGB image data $LD_{RGB}$, the print data creating unit 318 (1) for RGB image data $LD_{RGB}$ on which no red-eye correction has been executed by the red-eye correction unit 317 (see "NO" in S312), creates print data PD from the RGB image data $LD_{RGB}$ and (2) for RGB image data $LD_{RGB}'$ on which red-eye correction has been executed by the red-eye correction unit 317, creates print data PD from the RGB image data $LD_{RGB}'$ (S314), and then transfers these print data PD to the printing mechanism 3120 (S315). FIG. 19D is a view that shows the printed image G0 on which red-eye correction has been executed.

According to the second aspect of the invention, when the image data are read, red-eye detection is executed while the red-eye area is stored in the red-eye area table, and then red-eye correction is executed when the read data are transferred to the printer. Thus, it is possible to reduce the number of driving of the scanner, and it is possible to execute red-eye correction without any positional deviation.

Exemplary Embodiment of Third Aspect

First Exemplary Embodiment

Figure 24:
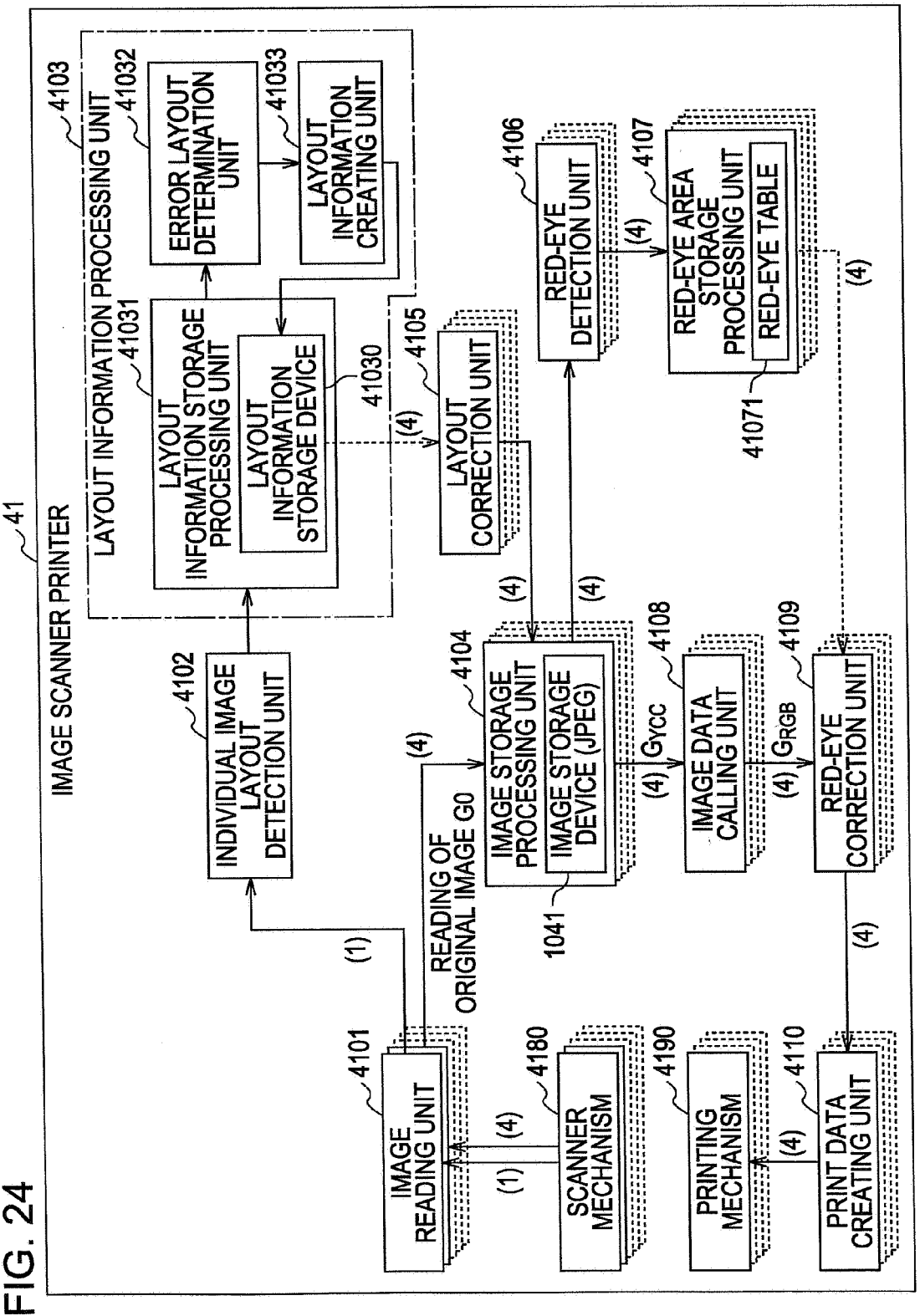
FIG. 24 is a block diagram illustrating a first exemplary embodiment of an image scanner printer according to a third aspect of the invention.

FIG. 24 is a block diagram illustrating a first exemplary embodiment of an image scanner printer according to a third aspect of the invention. As shown in FIG. 24, the image scanner printer 41 is configured so that an original image G0 that includes a plurality of individual images g1 to gN (FIG. 24 shows a case where N=4) is read by a scanner mechanism 4180 and printed by a printing mechanism 4190. The image scanner printer 41 includes an image reading unit 4101, an individual image layout detection unit 4102, a layout information processing unit 4103, an image storage processing unit 4104, a layout correction unit 4105, a red-eye detection unit 4106, a red-eye area storage processing unit 4107, an image data calling unit 4108, a red-eye correction unit 4109, and a print data creating unit 4110.

The image reading unit 4101 drives the scanner mechanism 4180 and, after reading the original image G0 by pre-scan, sequentially reads the individual images g1 to gN by main scan that is performed the same number of times as the number of individual images g1 to gN. When pre-scan is performed by the image reading unit 4101, the individual image layout detection unit 4102 detects the layouts of the individual images g1 to gN.

When the individual images g1 to gN, which are detected by the individual image layout detection unit 4102, are read incorrectly in layout, the layout information processing unit 4103 creates layout information LY to correct the incorrectly read layout for the individual images. The layout information processing unit 4103 may be formed of a layout information storage processing unit 41031, an incorrect layout determination unit 41032, and a layout information creating unit 41033. The layout information processing unit 4103 stores the layouts of the individual images g1 to gN, which are detected by the individual image layout detection unit 4102, in a layout information storage device 41030 as the layout information LY that at least includes positional information (coordinate) and tilt angle information. The layout information LY may include size information of the individual images g1 to gN.

The incorrect layout determination unit 41032 determines whether the individual images g1 to gN, which are stored in the layout information storage device 41030, are read incorrectly in layout. The incorrect layout determination unit 41032 determines whether the individual images g1 to gN are incorrectly read in layout. The layout information creating unit 41033 creates the layout information LY in which the individual images that are read incorrectly in layout are corrected in layout, and then stores the layout information LY in the layout information storage device 41030.

The image storage processing unit 4104 stores one of the individual images (one of g1 to gN) corresponding to the number of times scanned in an image storage device 41041 as JPEG data ($G_{YCC}$) each time the image reading unit 4101 performs main scan. The layout correction unit 4105 determines whether the individual image stored in the image storage device 41041 is read incorrectly in layout by referring to the layout information LY each time the image reading unit 4101 performs main scan. When the individual image (any one of g1 to gN) has been read incorrectly in layout, the layout correction unit 4105 executes a layout correction process on the image data of the individual image (one of g1 to gN) that has been read incorrectly in layout so as to correct the incorrect layout. Note that, when the layout information LY includes the size information of the individual images g1 to gN, it may be configured to correct the sizes of the individual images g1 to gN to the same size.

The red-eye detection unit 4106 detects whether red-eye is included in an image corresponding to the image data of a corresponding one of the individual images g1 to gN, which are stored in the image storage device 41041, each time the image reading unit 4101 performs main scan. The red-eye area storage processing unit 4107 stores a red-eye area in the red-eye table 41071 when the red-eye detection unit 4106 has detected that red-eye is included in an image corresponding to the image data of a corresponding one of the individual images each time the image reading unit 4101 performs main scan.

The image data calling unit 4108 calls the image data (JPEG data $G_{YCC}$) of the individual image portion by portion from the image storage device 41041 and converts the data into RGB data each time the image reading unit 4101 performs main scan. The red-eye correction unit 4109 executes red-eye correction on image data when an image corresponding to the image data, which is called by the image data calling unit 4108, includes a red-eye area each time the image reading unit 4101 performs main scan.

Each time the image reading unit 4101 performs main scan, among the image data called by the image data calling unit 4108, the print data creating unit 4110, for image data on which no red-eye correction has been executed by the red-eye correction unit 4109, creates print data from the image data on which no red-eye correction has been executed by the red-eye correction unit 4109 and, for image data on which red-eye correction has been executed by the red-eye correction unit 4109, creates print data from the image data on which red-eye correction has been executed by the red-eye correction unit 4109, and then transfers these print data to the printing mechanism 4190.

Figure 25:
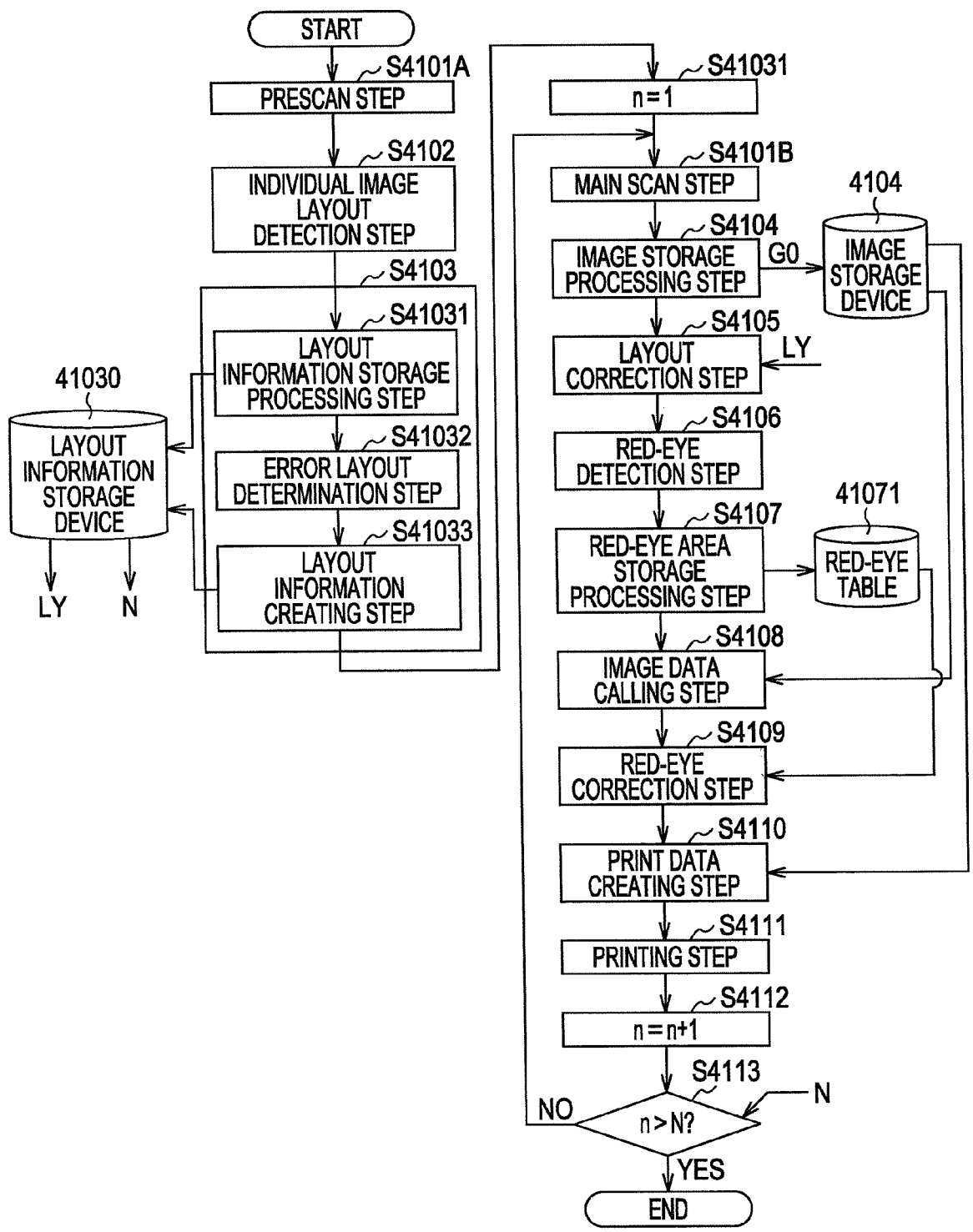
FIG. 25 is a flowchart that shows the operation of the image scanner printer of FIG. 24.

A printing method, which is executed by the image scanner printer 41 shown in FIG. 24, will now be described with reference to the flowchart of FIG. 25, FIG. 26A and FIG. 26B. In this printing method, as described below, the original image G0 that includes the plurality of individual images g1 to gN is read by the scanner through an operation of pre-scan and multiple operations of main scan and then printed.

Original copies, such as a plurality of pictures, are set to the scanner, and then the scanner mechanism 4180 is driven. After that, pre-scan of the original image G0 is performed by the image reading unit 4101 (pre-scan step S4101A). The picture, or the like, might be set incorrectly to the scanner in layout (when it is set obliquely or set out of position to the upper, lower, left or right side); however, in the aspect of the invention, even when the layout of the picture, or the like, is incorrect, the scanning will be performed as it is.

In the present exemplary embodiment, reading is performed in monochrome in the pre-scan step S4101A. Note that the pre-scan may be performed by reading in a resolution that is lower than main scan, which will be described later. FIG. 26A is a view that shows an example of a pre-scanned image. The individual image layout detection unit 4102 detects the layouts of the individual images g1 to gN (here, N=4) in the image that is read in the pre-scan step S4101A (individual image layout detection step S4102). For example, by determining the rectangular outline of a picture, or the like, from pixels of the read image, the number of individual images, the size of individual images, and the tilt angle of individual images are detected.

When the individual image layout detection unit 4102 detects that the individual images g1 to gN are incorrectly read in layout in the individual image layout detection step S4102, the layout information processing unit 4103 creates the layout information LY in which the individual images (hereinafter, denoted by "gk") are corrected in layout (layout information processing step S4103). The layout information LY is a tilt angle when the individual image gk is tilted, and the layout information LY is a position coordinate (for example, a coordinate at the upper left to the individual image) when the individual image gk is out of position.

In the layout information processing step S4103, the layouts of the individual images gk that are detected in the individual image layout detection step S4102 are stored in the layout information storage device 41030 as the layout information LY that at least includes the positional information and the tilt angle information (layout information storage processing step S41031), it is determined whether these individual images gk are read incorrectly in layout (incorrect layout determination step S41032), and, when the individual images gk are determined to be read incorrectly read in layout, creates the layout information LY in which the individual images that are incorrectly read in layout are corrected in layout and stores the layout information LY (layout information creating step S41033).

Although not shown in FIG. 24, the value n of the reading count register is set for "1" (S41031), and the first reading of the individual image gk is performed by the image reading unit 4101 (main scan step S4101B). The reading in this main scan step S4101B is performed in the same number of times (N times) as the number of individual images. In this reading, the image reading unit 4101 may be configured to perform scanning only an area of the individual image g1 within the original image G0 or may be configured to extract the image of an area of the individual image g1 after the entire original image G0 has been scanned.

The image storage processing unit 4104 stores the image data of the individual image g1 (image storage processing step S4104), determines whether the individual image g1, which has been stored in the image storage processing step S4104, is read incorrectly in layout by referring to the layout information LY stored in the layout information storage device 41030, and, when the read layout is incorrect, executes a layout correction process on the image data of the individual image so as to be corrected in layout (layout correction step S4105).

Subsequently, the red-eye detection unit 4105 detects whether an image corresponding to the image data of the individual image g1, which has been stored in the image storage processing step S4104, includes red-eye (red-eye detection step S4106) and, when it has been detected that the image corresponding to the image data of the individual image g1 includes red-eye, the red-eye area storage processing unit 4107 stores a red-eye area (red-eye area storage processing step S4107). For this red-eye detection, a known method, for example, a method that checks a pattern of human face within the individual image g1, or the like, is employed.

After that, the image data calling unit 4108 calls portion by portion the image data (JPEG data $G_{YCC}$) of the individual image g1, which have been stored in image storage processing step S4104, and converts the data into RGB data (image data calling step S4108). When the image corresponding to the called image data includes the red-eye area, which has been stored in the red-eye area storage processing step S4107, the red-eye correction unit 4109 executes red-eye correction on the image data (red-eye correction step S4109).

After this red-eye correction, among the image data that are called in the image data calling step S4108, the print data creating unit 4110, for image data on which no red-eye correction has been executed, creates print data from the image data on which no red-eye correction has been executed and, for image data on which the red-eye correction has been executed, creates print data from the image data on which the red-eye correction has been executed, and then transfers the print data to the printing mechanism 4190 (print data creating step S4110). Then, printing is performed (printing step S4111).

After that, the value n of the register, set in the step S41031, is incremented (n=n+1) (S4112). Then, by referring to the value of N stored in the layout information storage device 41030, it is determined whether n>N, and, as in the case of the individual image g1, the processes in S4101B, S4104 to S4112 are executed on all the individual images until n>N (here, N=4) (S4113, "end"). FIG. 26B is a view that shows an example of a process executed in image storage processing step S4104, a process executed in layout correction step S4105, and a process executed in red-eye correction step S4109 in four times of operations of main scan.

Second Exemplary Embodiment

Figure 27:
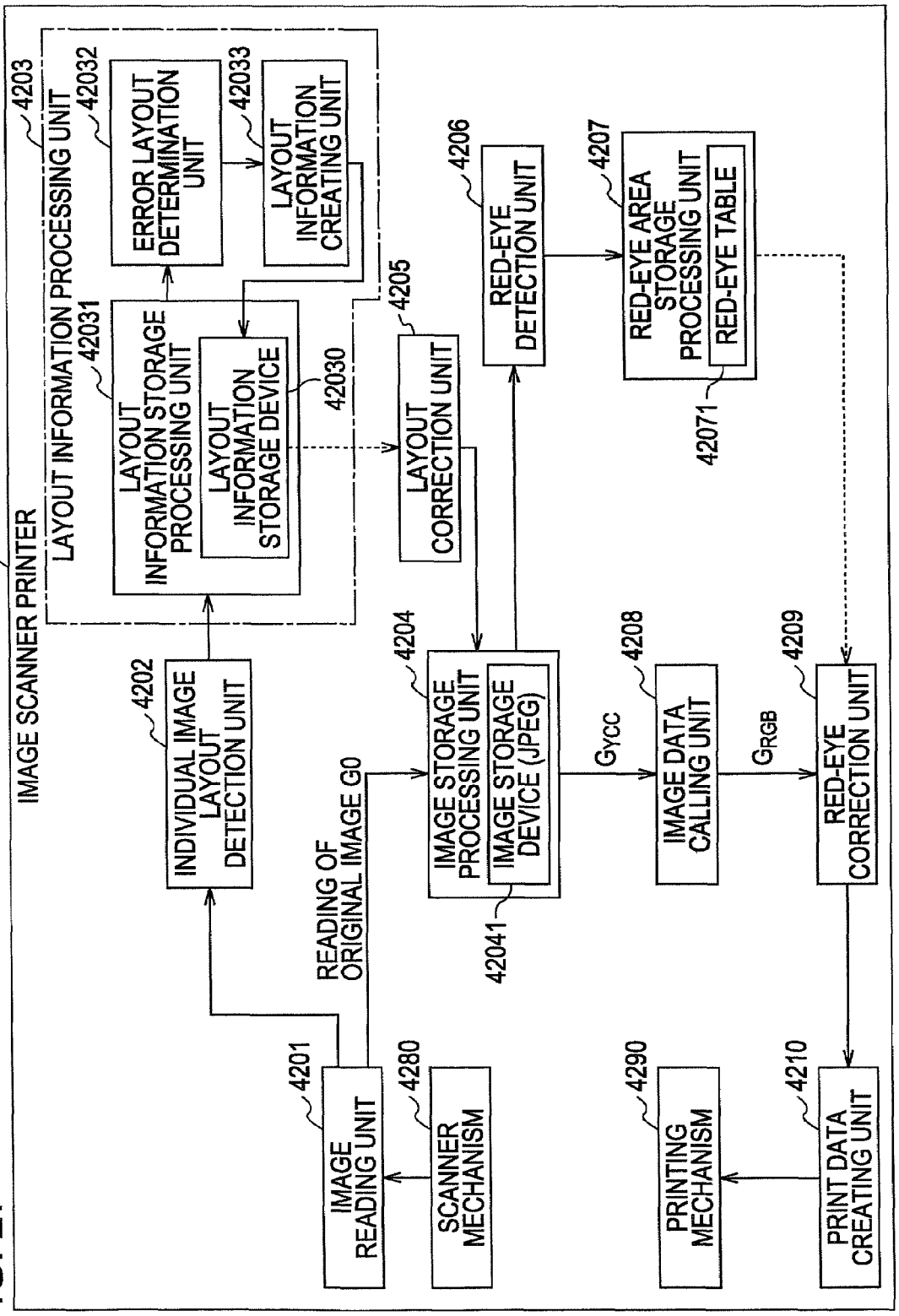
FIG. 27 is a block diagram illustrating a second exemplary embodiment of an image scanner printer according to the third aspect of the invention.

FIG. 27 is a block diagram illustrating one exemplary embodiment of an image scanner printer according to the third aspect of the invention. As shown in FIG. 27, the image scanner printer 42 is configured so that an original image G0 that includes a plurality of individual images g1 to gN (N=4 in the present exemplary embodiment) is read by a scanner mechanism 4280 and printed by a printing mechanism 4290. The image scanner printer 42 includes an image reading unit 4201, an individual image layout detection unit 4202, a layout information processing unit 4203, an image storage processing unit 4204, a layout correction unit 4205, a red-eye detection unit 4206, a red-eye area storage processing unit 4207, an image data calling unit 4208, a red-eye correction unit 4209, and a print data creating unit 4210.

The image reading unit 4201 drives the scanner mechanism 4280 and, after reading the original image G0 by pre-scan, reads the original image G0 by main scan. When pre-scan is performed by the image reading unit 4201, the individual image layout detection unit 4202 detects the layouts of the individual images g1 to gN.

When the individual images g1 to gN, which are detected by the individual image layout detection unit 4202, are read incorrectly in layout, the layout information processing unit 4203 creates layout information LY to correct the incorrectly read layout for the individual images. The layout information processing unit 4203 may be formed of a layout information storage processing unit 42031, an incorrect layout determination unit 42032, and a layout information creating unit 42033. The layout information storage processing unit 42031 stores the layouts of the individual images g1 to gN, which have been detected by the individual image layout detection unit 4202, in a layout information storage device 42030 as the layout information LY that at least includes positional information and tilt angle information.

The incorrect layout determination unit 42032 determines whether at least one of the individual images g1 to gN, which are stored in the layout information storage device 42030, is read incorrectly in layout. When the incorrect layout determination unit 42032 determines that the at least one of the individual images is read incorrectly in layout, the layout information creating unit 42033 creates the layout information LY in which the layout of the at least one of the individual images is corrected and stores the layout information LY in the layout information storage device 42030. The image storage processing unit 4204 stores the original image that is read through main scan by the image reading unit 4201 in an image storage device 42041 as JPEG data ($G_{YCC}$).

When at least one of the individual images g1 to gN within the original image, which is stored in the image storage device 42041, is read incorrectly in layout, the layout correction unit 4205 refers to the layout information LY and executes a layout correction process on the image data of a corresponding one of the individual images g1 to gN so as to correct the layout of that individual image. The red-eye detection unit 4206 detects whether red-eye is included in images corresponding to image data of the individual images g1 to gN within the original image G0, which have been stored in the image storage device 42041.

The red-eye area storage processing unit 4207 stores a red-eye area in a red-eye table 42071 when the red-eye detection unit 4206 has detected that red-eye is included in the images corresponding to the image data of the individual images g1 to gN. The image data calling unit 4208 calls the image data (JPEG data $G_{YCC}$) of the original image stored in the image storage device 42041 portion by portion from the image storage device 42041, and converts the data into RGB data. When the images corresponding to the image data called by the image data calling unit 4208 include a red-eye area that is stored in the red-eye table 42071, the red-eye correction unit 4209 executes red-eye correction on the image data.

Among the image data called by the image data calling unit 4208, the print data creating unit 4210, for image data on which no red-eye correction has been executed by the red-eye correction unit 4209, creates print data from the image data on which no red-eye correction has been executed by the red-eye correction unit 4209 and, for image data on which the red-eye correction has been executed by the red-eye correction unit 4209, creates print data from the image data on which the red-eye correction has been executed by the red-eye correction unit 4209, and then transfers these print data to the printing mechanism 4290.

Figure 28:
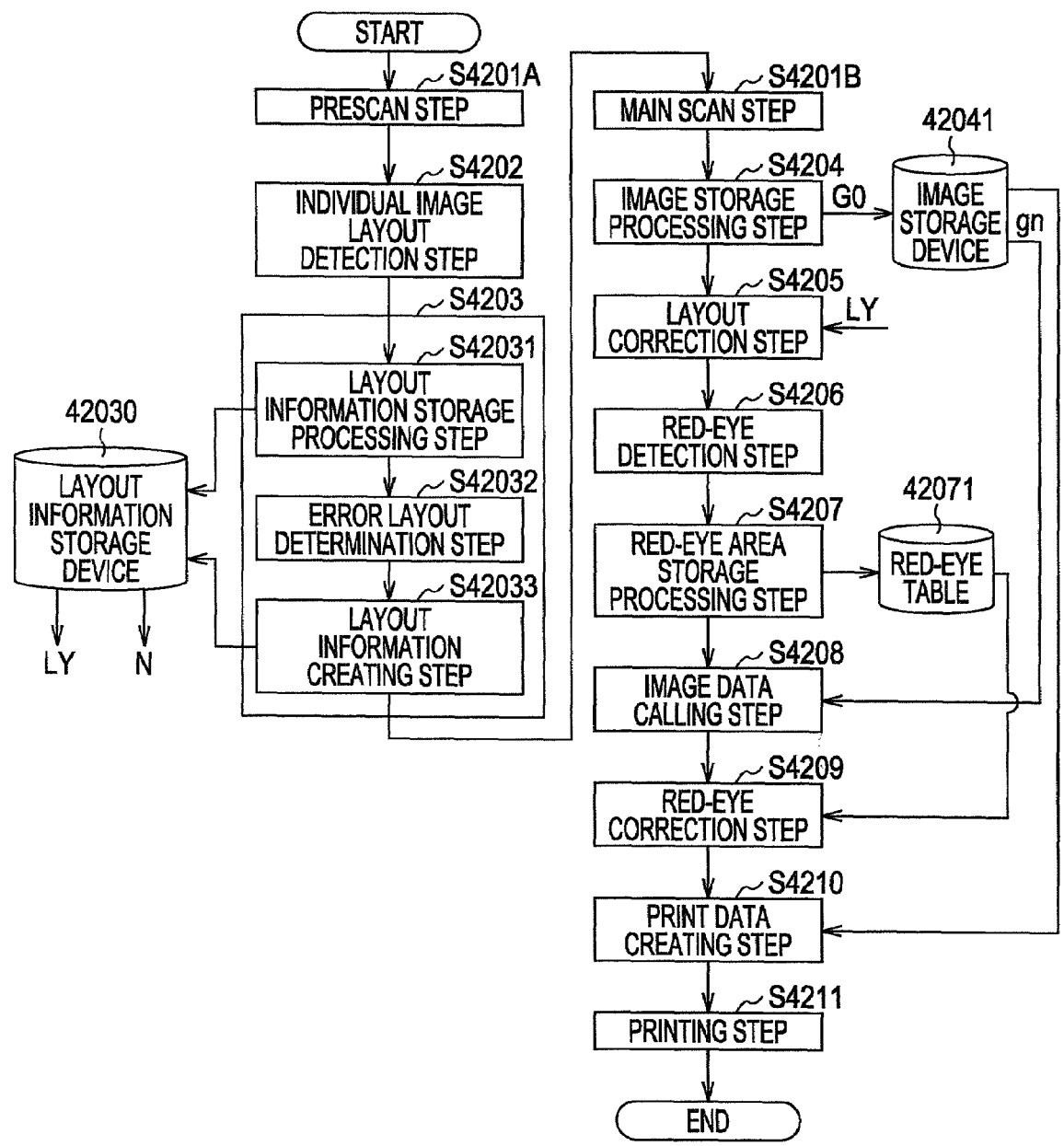
FIG. 28 is a flowchart that shows the operation of the image scanner printer of FIG. 27.

A printing method, which is executed by the image scanner printer 42 shown in FIG. 27, will now be described with reference to the flowchart of FIG. 28, FIG. 29A and FIG. 29B. In this printing method, as described below, the original image G0 that includes the plurality of individual images g1 to gN is read by the scanner through a single operation of pre-scan and a single operation of main scan and then printed. The process executed in pre-scan step S4201A in which the image reading unit 4201 performs pre-scan on the original image G0 is the same process as the process executed by the image reading unit 4101 of the first exemplary embodiment in the pre-scan step S4101A. FIG. 29A is a view that shows an example of a pre-scanned image.

The processes executed in individual image layout detection step S4202, layout information processing step S4203 (layout information storage processing step S42031, incorrect layout determination step S42032, layout information creating step S42033) are the same processes as those executed in the individual image layout detection step S4102, the layout information processing step S4103 (layout information storage processing step S41031, incorrect layout determination step S41032, layout information creating step S41033) according to the first exemplary embodiment. After the pre-scan step S4201A has been executed, the image reading unit 4201 reads the entire original image G0 again (main scan step S4201B) and stores the image data of the original image G0 in the image storage device 4204 (image storage processing step S4204).

Then, when any one of the individual images g1 to gN within the original image G0 is read incorrectly in layout, the layout correction unit 4205 refers to the layout information LY and executes a layout correction process on the image data of the incorrectly read individual image so as to correct the individual image in layout (layout correction step S4205). Subsequently, the red-eye detection unit 4206 detects whether the images corresponding to the image data of the individual images g1 to gN include red-eye (red-eye detection step S4206). When it has been detected that the images corresponding to the image data of the individual images g1 to gN include red-eye, the red-eye area storage processing unit 4207 stores a red-eye area in a red-eye table 42071 (red-eye area storage processing step S4207).

After that, the image data (JPEG data $G_{YCC}$) of the original image G0, which have been stored in image storage processing step S4204, are called from the image storage device 42041 portion by portion and converted into RGB data (image data calling step S4208). When an image corresponding to the called image data includes a red-eye area, the red-eye correction unit 4209 executes red-eye correction on the image data (red-eye correction step S4209).

After this red-eye correction, among the image data that are called in the image data calling step S4208, the print data creating unit 4210, for image data on which no red-eye correction has been executed in the red-eye correction step S4209, creates print data from the image data on which no red-eye correction has been executed in the red-eye correction step S4209 and, for image data on which red-eye correction has been executed in the red-eye correction step S4209, creates print data from the image data on which red-eye correction has been executed in the red-eye correction step S4209, and then transfers the print data to the printing mechanism 4290 (print data creating step S4210).

FIG. 29B is a view that shows an example of the process executed in the image storage processing step S4204, the process executed in the layout correction step S4205, and the process executed in the red-eye correction step S4209, in main scan.

Third Exemplary Embodiment

FIG. 30 is a block diagram illustrating an image scanner printer according to one exemplary embodiment of the invention. As shown in FIG. 30, the image scanner printer 43 is configured so that an original image G0 that includes a plurality of individual images g1 to gN (N=4 in FIG. 30) is read by a scanner mechanism 4380 and printed by a printing mechanism 4390. The image scanner printer 43 includes an image reading unit 4301, an individual image layout detection unit 4302, a layout information processing unit 4303, an individual image data separate storage unit 4304, a layout correction unit 4305, an image storage processing unit 4306, a red-eye detection unit 4307, a red-eye area storage processing unit 4308, an image data calling unit 4309, a red-eye correction unit 4310, and a print data creating unit 4311.

The image reading unit 4301 drives the scanner mechanism 4380 and, after reading the original image G0 by pre-scan, reads the original image G0 by main scan. When pre-scan is performed by the image reading unit 4301, the individual image layout detection unit 4302 detects the layouts of the individual images g1 to gN (N=4 in the present exemplary embodiment). When the individual images g1 to gN, which are detected by the individual image layout detection unit 4302, are read incorrectly in layout, the layout information processing unit 4303 creates layout information LY to correct the incorrectly read layout for the individual images.

The layout information processing unit 4303 includes a layout information storage processing unit 43031 and an incorrect layout determination unit 43032. The layout information storage processing unit 43031 stores the layouts of the individual images g1 to gN, which have been detected by the individual image layout detection unit 4302, in a layout information storage device 43030 as the layout information LY that at least includes positional information and tilt angle information. The incorrect layout determination unit 43032 determines whether the individual images g1 to gN, which are stored in the layout information storage device 43030, are read incorrectly in layout.

When the incorrect layout determination unit 43032 determines that the individual image is read incorrectly in layout, the layout information creating unit 43033 creates the layout information LY in which the individual image is corrected in layout and stores the layout information LY in the layout information storage device 43030. When the image reading unit 4301 performs main scan, the individual image data separate storage unit 4304 stores a predetermined number of lines of image data and separates the predetermined number of lines of image data into the image data of the respective individual images g1 to gN on the basis of the layout information LY that has been created by the layout information processing unit 4303, and then stores the separated data. When at least one of the individual images within the original image G0, which is stored in the individual image data separate storage unit 4304, is read incorrectly in layout, the layout correction unit 4305 refers to the layout information LY and executes a layout correction process on the image data of a corresponding one of the individual images g1 to gN so as to correct the layout of that individual image.

The image storage processing unit 4306 stores the individual image data, which have been separated by the individual image data separate storage unit 4304, in an image storage device 43061 as JPEG data ($G_{YCC}$). The red-eye detection unit 4307 detects whether red-eye is included in images corresponding to image data of the individual images within the original image G0, which is stored in the image storage device 43061. The red-eye area storage processing unit 4308 stores a red-eye area in a red-eye table 43081 when the red-eye detection unit 4307 has detected that red-eye is included in the images corresponding to the image data of the individual images g1 to gN. The image data calling unit 4309 calls the image data (JPEG data $G_{YCC}$) of the original image, which are stored in the image storage device 43061, portion by portion from the image storage device 43061 as RGB data.

When the images corresponding to the image data called by the image data calling unit 4309 include a red-eye area stored in the red-eye table 43081, the red-eye correction unit 4310 executes red-eye correction on the image data. Among the image data called by the image data calling unit 4309, the print data creating unit 4311, for image data on which no red-eye correction has been executed by the red-eye correction unit 4310, creates print data from the image data on which no red-eye correction has been executed by the red-eye correction unit 4310 and, for image data on which the red-eye correction has been executed by the red-eye correction unit 4310, creates print data from the image data on which the red-eye correction has been executed by the red-eye correction unit 4310, and then transfers these print data to the printing mechanism 4390.

Figure 31:
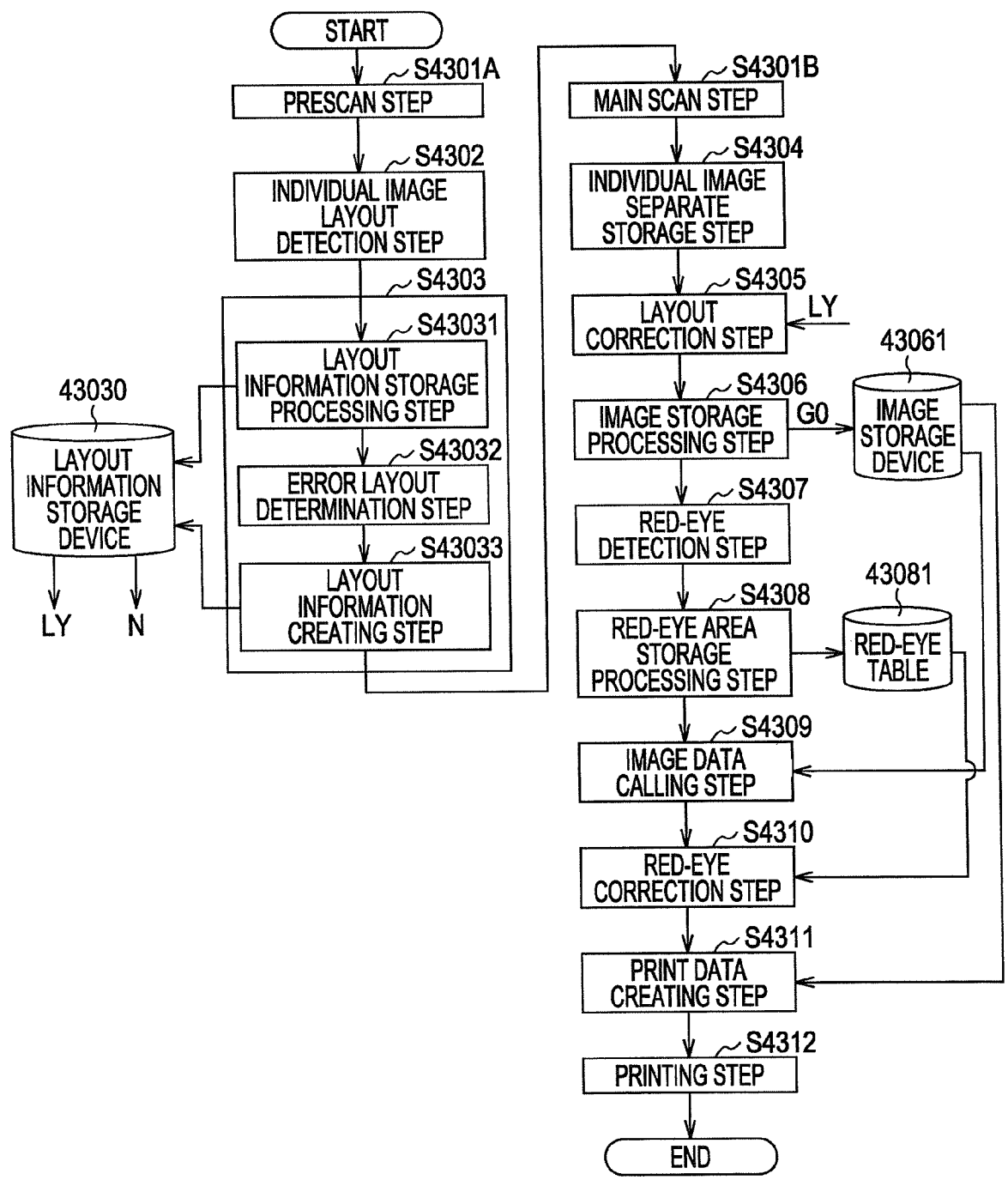
FIG. 31 is a flowchart that shows the operation of the image scanner printer of FIG. 30.

A printing method, which is executed by the image scanner printer 43 shown in FIG. 30, will now be described with reference to the flowchart of FIG. 31, FIG. 32A and FIG. 32B. In this printing method, as in the case of the second exemplary embodiment, the original image G0 that includes the plurality of individual images g1 to gN is read by the scanner through a single operation of pre-scan and a single operation of main scan and then printed. The process executed in pre-scan step S4301A in which the image reading unit 4301 performs pre-scan on the original image G0 is the same process as the process executed by the image reading unit 4101 of the first exemplary embodiment in the pre-scan step S4101A and the process executed by the image reading unit 4201 of the second exemplary embodiment in the pre-scan step S4201A. FIG. 32A is a view that shows an example of a pre-scanned image.

The processes executed in individual image layout detection step S4302, layout information processing step S4303 (layout information storage processing step S43031, incorrect layout determination step S43032, layout information creating step S43033) are the same processes as those executed in the individual image layout detection step S4102, the layout information processing step S4103 (layout information storage processing step S41031, incorrect layout determination step S41032, layout information creating step S41033) according to the first exemplary embodiment and those executed in the individual image layout detection step S4202, the layout information processing step S4203 (layout information storage processing step S42031, incorrect layout determination step S42032, layout information creating step S42033) according to the second exemplary embodiment. After the pre-scan step S4301A has been executed, the image reading unit 4301 reads the entire original image G0 again (main scan step S4301B). In this reading, the individual image data separate storage unit 4304 stores a predetermined number of lines of the image data and separates the predetermined number of lines of image data into the image data of the respective individual images g1 to gN on the basis of the layout information LY that has been created in the layout information processing step S4303 and then stores the separated data (individual image data separate storage step S4304).

Then, when the image data, which have been stored in the individual image data separate storage step S4304, are image data of the individual images g1 to gN that are incorrect in layout, the layout correction unit 4305 refers to the layout information LY and executes a layout correction process on the image data so that an image corresponding to the image data is corrected in layout (layout correction step S4305), and the image storage processing unit 4306 stores these separated image data in the image storage device 43061 (image storage processing step S4306).

In layout correction step S4305, as shown in FIG. 32B, a predetermined number of lines of an image are stored in a plurality of line buffers and a storage capacity is provided sufficiently to store the entire pixel line in the horizontal direction, when the layout is correct, in the plurality of line buffers LB. Then, the pixel line of the correct layout is extracted from the plurality of line buffers LB and stored in the image storage device 43061 in the image processing step S4306, which will be described later, and then red-eye correction is executed in the red-eye correction step S4310. Subsequently, it is detected whether images corresponding to the image data of the individual images g1 to gN within the original image, which have been stored in the image storage processing step S4306, include red-eye (red-eye detection step S4307). When it has been detected that red-eye is included in the images, the red-eye area storage processing unit 4308 stores a red-eye area in the red-eye table 43081 (red-eye area storage processing step S4308).

After that, the image data (JPEG data $G_{YCC}$) of the original image G0, which are stored in the image storage device 43061, are called portion by portion from the image storage device 43061 (image data calling step S4309). When an image corresponding to the called image data include a red-eye area, the red-eye correction unit 4310 executes red-eye correction on the image data (red-eye correction step S4310). After this red-eye correction, among the image data that are called in the image data calling step S4309, the print data creating unit 4311, for image data on which no red-eye correction has been executed in the red-eye correction step S4310, creates print data from the image data on which no red-eye correction has been executed in the red-eye correction step S4310 and, for image data on which the red-eye correction has been executed in the red-eye correction step S4310, creates print data from the image data on which the red-eye correction has been executed in the red-eye correction step S4310, and then transfers the print data to the printing mechanism 4390 (print data creating step S4311).

According to the third aspect of the invention, when a plurality of images including a human picture are read, it is possible to execute red-eye correction when red-eye is included in the picture while, when the layouts of the images are incorrect, the layouts are automatically corrected, and then to print out the images separately. In addition, when a plurality of images including a human picture are read, it is possible to execute red-eye correction when red-eye is included in the picture while, when the layouts of the images are incorrect, the layouts are automatically corrected, and then to print out the plurality of images as one unit image. Furthermore, it is possible to perform the above printing using a small amount of memory resources.

According to the above described image scanner printers 41, 42, 43, a user is able to automatically execute the processes according to the printing method of the aspects of the invention by manipulating a predetermined selection unit (selection button, or the like) and also able to not execute the processes according to the printing method of the aspects of the invention.

What is claimed is:

1. An image scanner printer that reads an original image and that prints out the original image, comprising:
   a red-eye detection unit that detects red-eye that is included in an image corresponding to a predetermined number of lines of RGB image data when the original image is read;
   a YCC image storage processing unit that converts the predetermined number of lines of the RGB image data into YCC image data and stores all the data as one unit JPEG image;
   a YCC/RGB conversion unit that converts the YCC image data into RGB image data in units of a line or in units of a predetermined number of lines;
   a red-eye correction unit that executes red-eye correction on the RGB image data when an image corresponding to the converted RGB image data includes a red-eye area that is stored in a red-eye table; and
   a print data creating unit that, among the RGB image data, for RGB image data on which the red-eye correction has been performed, creates print data from the RGB image data on which the red-eye correction has been performed, when the print data are created from the RGB image data.

2. The image scanner printer according to claim 1, wherein the red-eye correction unit, for executing red-eye correction on the image data, stores YCC image data, which will be converted by the YCC/RGB conversion unit, in a line data temporary storage processing unit in units of a predetermined number of lines.

* * * * *